United States Patent
Xu et al.

(10) Patent No.: US 11,246,186 B2
(45) Date of Patent: Feb. 8, 2022

(54) DATA TRANSMISSION METHOD, DEVICE, AND SYSTEM

(71) Applicant: HUAWEI TECHNOLOGIES CO., LTD., Guangdong (CN)

(72) Inventors: Haibo Xu, Beijing (CN); Nathan Edward Tenny, San Diego, CA (US); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

(21) Appl. No.: 16/338,316

(22) PCT Filed: Sep. 30, 2016

(86) PCT No.: PCT/CN2016/101406
§ 371 (c)(1),
(2) Date: Mar. 29, 2019

(87) PCT Pub. No.: WO2018/058683
PCT Pub. Date: Apr. 5, 2018

(65) Prior Publication Data
US 2019/0239284 A1 Aug. 1, 2019

(51) Int. Cl.
*H04W 88/04* (2009.01)
*H04W 72/04* (2009.01)
*H04W 76/11* (2018.01)
*H04W 68/00* (2009.01)
*H04W 80/02* (2009.01)
(Continued)

(52) U.S. Cl.
CPC .......... *H04W 88/04* (2013.01); *H04W 68/005* (2013.01); *H04W 72/0406* (2013.01); *H04W 72/048* (2013.01); *H04W 76/11* (2018.02); *H04W 80/02* (2013.01); *H04W 92/10* (2013.01); *H04W 92/18* (2013.01)

(58) Field of Classification Search
None
See application file for complete search history.

(56) References Cited

U.S. PATENT DOCUMENTS

| | | |
|---|---|---|
| 9,414,338 B2 | 8/2016 | Cai et al. |
| 2012/0243462 A1 | 9/2012 | Bucknell et al. |
| 2015/0029866 A1 | 1/2015 | Liao et al. |

(Continued)

FOREIGN PATENT DOCUMENTS

| | | |
|---|---|---|
| CN | 104796849 A | 7/2015 |
| CN | 104954976 A | 9/2015 |
| WO | 2016114604 A1 | 7/2016 |

OTHER PUBLICATIONS

Extended European Search Report issued in European Application No. 16917433.1 dated Jul. 12, 2019, 8 pages.

(Continued)

*Primary Examiner* — Lonnie V Sweet
(74) *Attorney, Agent, or Firm* — Fish & Richardson P.C.

(57) ABSTRACT

The present disclosure relates to data transmission methods, devices, and systems. One example method includes receiving, by a relay UE, data of a remote UE, where the data includes a first identifier of the remote UE, determining, by the relay UE, a second identifier of the remote UE based on the first identifier, and sending the data of the remote UE and the second identifier of the remote UE to a base station.

20 Claims, 14 Drawing Sheets

(51) Int. Cl.
*H04W 92/10* (2009.01)
*H04W 92/18* (2009.01)

(56) References Cited

U.S. PATENT DOCUMENTS

| | | | |
|---|---|---|---|
| 2015/0230209 A1 | 8/2015 | Jactat et al. | |
| 2017/0111754 A1* | 4/2017 | Baghel | H04L 69/22 |
| 2018/0077608 A1* | 3/2018 | Jung | H04W 88/04 |
| 2018/0213577 A1* | 7/2018 | Burbidge | H04W 76/10 |
| 2019/0029061 A1* | 1/2019 | Feng | H04W 72/14 |

OTHER PUBLICATIONS

R2-153241—Huawei et al., "UE-to-Network Relay connection establishment," 3GPP TSG-RAN WG2 #91, Beijing, China, Aug. 24-28, 2015, XP051003998, 3 pages.

3GPP TR 36.746 V0.1.0 (Aug. 2016), "3rd Generation Partnership Project; Technical Specification Group Radio Access Network; Study on further enhancements to LTE Device to Device (D2D), User Equipment (UE) to network relays for Internet of Things (IoT) and wearables; (Release 14)," Technical Report, Aug. 2016, 8 pages.

PCT International Search Report and Written Opinion issued in International Application No. PCT/CN2016/101406 dated Jun. 27, 2017, 16 pages (with English translation).

R2-154055—CATT, "Considerations on Layer-2 ID Collision," 3GPP TSG RAN WG2 Meeting #91bis, Malmo, Sweden, Oct. 5-9, 2015, 5 pages.

R2-154545—Huawei, HiSilicon, "L2 impacts of ProSe one-to-one communication," 3GPP TSG-RAN WG2 Meeting #91bis, Malmo, Sweden, Oct. 5-9, 2015, 4 pages.

Office Action issued in Chinese Application No. 201680089036.9 dated Mar. 13, 2020, 28 pages (with English translation).

* cited by examiner

DATA TRANSMISSION METHOD, DEVICE, AND SYSTEM

CROSS-REFERENCE TO RELATED APPLICATIONS

This application is a National Stage of International Application No. PCT/CN2016/101406, filed on Sep. 30, 2016, which is hereby incorporated by reference in its entirety.

TECHNICAL FIELD

The present invention relates to the field of communications technologies, and in particular, to a data transmission method, a device, and a system.

BACKGROUND

Currently, in a device-to-device (D2D) communication manner, a relatively special manner is that one user equipment (UE) is connected to a network by using another UE that has a relay function. Generally, the former is referred to as remote user equipment (Remote UE), the latter is referred to as relay user equipment (Relay UE), and a communication link between the remote UE and the relay UE is referred to as a sidelink.

In the Long Term Evolution (LTE) protocol Release 13 (Rel-13) for layer-3 based relay, a main problem is that after receiving data from relay UE, a base station cannot identify whether the data comes from the relay UE or comes from remote UE served by the relay UE. To resolve this problem, 3GPP currently starts to research layer-2 based relay. In relay UE-based communication, relay UE needs to provide access to a plurality of remote UEs. In this case, a technical solution for how the base station and the relay UE identify specific UE (the relay UE or remote UE connected to the relay UE) from which data comes or to which data is transmitted is as follows: The relay UE configures an independent radio bearer (RB) for each data flow of each remote UE, so that each data flow is transmitted to the base station by using the independent radio bearer; and each radio bearer has a unique logical channel identifier (LCID), so that the base station identifies, based on the LCD, specific UE from which received data comes.

However, a current LCID has only 5 bits, and has limited values, that is, has only 0 to 32 values, and some values are already used to indicate other information such as a Medium Access Control control element (MAC CE) type. When the relay UE serves a relatively large quantity of remote UEs, or each remote UE has a relatively large quantity of data flows, currently limited LCID values cannot support the relay UE in configuring a radio bearer with a unique identifier for each data flow of each remote UE. This severely affects normal data transmission of the remote UE, and still cannot well resolve a problem of how the base station/the relay UE identifies specific UE (the relay UE or remote UE connected to the relay UE) from which data comes or to which data is transmitted.

SUMMARY

This application provides a data transmission method, a device, and a system, to resolve a problem of how a base station identifies specific UE (relay UE or remote UE connected to the relay UE) from which received data sent by the relay UE comes, and a problem of how the relay UE identifies specific UE (the relay UE or remote UE connected to the relay UE) to which data sent by the base station and received by the relay UE is transmitted.

To achieve the foregoing objective, the following technical solutions are used in this application.

According to a first aspect, a data transmission method is provided, where the method is performed by relay UE, and may include:

receiving data that is sent by remote UE and that includes a first identifier of the remote UE; determining a unique identifier, namely, a second identifier, of the remote UE on the relay UE based on the received first identifier of the remote UE; and sending the data of the remote UE together with the determined first identifier of the remote UE to a base station.

The first identifier may be a layer 2 address of the remote UE, for example, a source MAC address or a user equipment identifier used for device-to-device communication in an LTE system.

In this way, when sending the data to the base station, the relay UE also sends the second identifier of the remote UE to the base station, so that the base station identifies, based on the received second identifier of the remote UE, specific remote UE that is connected to the relay UE and that sends the received data.

Optionally, when sending the data of the remote UE to the base station, the relay UE may send the data of the remote UE by using a radio bearer that is set up by the relay UE for the remote UE. Specifically, in a possible implementation of the first aspect, with reference to the first aspect, the method may further include:

receiving, by the relay UE, a configuration parameter that is sent by a network device and that includes at least one first radio bearer used to transmit the data of the remote UE connected to the relay UE, where a configuration parameter of each of the at least one first radio bearer includes an identifier of the first radio bearer or a logical channel identifier LCID corresponding to the first radio bearer; and setting up the at least one first radio bearer for the remote UE based on the configuration parameter of the at least one first radio bearer;

determining, by the relay UE, a first radio bearer corresponding to the data of the remote UE; and sending, by the relay UE, the data to the base station by using the first radio bearer corresponding to the data, where the second identifier of the remote UE and an LCID of the first radio bearer corresponding to the data are sent together with the data.

It should be noted that in a process in which the relay UE determines the first radio bearer corresponding to the data of the remote UE, for same remote UE, one first radio bearer may be configured for data belonging to a same data flow, or one first radio bearer may be configured for data belonging to different data flows. This is not limited in this embodiment of the present invention. However, an identifier or an LCID of a first radio bearer corresponding to same remote UE is unique, and first radio bearers of different remote UEs may have a same identifier or LCID. To be specific, an identifier or an LCID of a radio bearer may be repeatedly used to identify radio bearers of different remote UEs.

In this way, when sending the data to the base station, the relay UE may also send the second identifier of the remote UE and the identifier or the LCID of the radio bearer corresponding to the data of the remote UE to the base station, so that the base station identifies, based on the received second identifier of the remote UE and the received identifier or LCID of the radio bearer, that the received data is sent on which radio bearer of which remote UE connected to the relay UE. In addition, in the foregoing possible implementation, different remote UEs may repeatedly use the identifier or the LCID of the radio bearer, thereby avoiding a problem that an existing identifier or LCID of a radio bearer is limited.

Optionally, in a second possible implementation of the first aspect, with reference to the first aspect or the possible implementation of the first aspect, the determining, by the relay UE, a first radio bearer corresponding to the data of the remote UE may include:

receiving, by the relay UE, data that is sent by the remote UE by using at least one second radio bearer and that carries an identifier of each second radio bearer or an LCID of each second radio bearer, and determining, based on the identifier of each second radio bearer or the LCID of each second radio bearer, the first radio bearer corresponding to the data of the remote UE.

In this way, the relay UE may determine a radio bearer between the relay UE and the base station based on a radio bearer used for transmitting data between the remote UE and the relay UE.

Optionally, in still another possible implementation of the first aspect, with reference to the first aspect or the possible implementations of the first aspect, the relay UE may add the second identifier of the remote UE, the LCID of the first radio bearer corresponding to the data, and the data into a Medium Access Control Protocol data unit MAC PDU, and send the MAC PDU to the base station.

Specifically, the second identifier of the remote UE may be carried in a first MAC subheader or a MAC CE in the MAC PDU and sent to the base station, the LCID of the first radio bearer corresponding to the data may be carried in a second MAC subheader in the MAC PDU and sent to the base station, and the data may be carried in a MAC SDU in the MAC PDU and sent to the base station.

As shown in FIG. 4a, the second identifier of the remote UE is included in the first MAC subheader and sent to the base station, the LCID of the first radio bearer corresponding to the data is carried in the second MAC subheader in the MAC PDU and sent to the base station, and the data is carried in the MAC SDU in the MAC PDU and sent to the base station. The second MAC subheader may be further used to indicate that the MAC PDU includes the data of the remote UE.

Alternatively, as shown in FIG. 4b, the first MAC subheader includes a bitmap bitmap, the bitmap includes at least one bit, a bit n in the at least one bit is used to indicate whether the MAC PDU includes data of remote UE whose second identifier is n and that is connected to the relay UE, and n is 0 or an integer greater than or equal to 1. To be specific, if the second identifier of the remote UE is n, the bit n may be filled with a value used to indicate that the MAC PDU includes the data of the remote UE, to associate the second identifier of the remote UE with the bit in the bitmap. The LCID of the first radio bearer corresponding to the data is carried in the second MAC subheader of the MAC PDU and sent to the base station. The data is carried in the MAC SDU of the MAC PDU and sent to the base station. The second MAC subheader may be further used to indicate that the MAC PDU includes the data of the remote UE.

Alternatively, as shown in FIG. 4c, the MAC CE includes the second identifier of the remote UE, the LCID of the first radio bearer corresponding to the data is carried in the second MAC subheader in the MAC PDU and sent to the base station, and the data is carried in the MAC SDU in the MAC PDU and sent to the base station. Correspondingly, the MAC PDU may further include a third MAC subheader, and the third subheader includes an LCID used to indicate that the MAC CE includes the second identifier of the remote UE.

Alternatively, as shown in FIG. 4b, the MAC CE includes a bitmap, the bitmap includes at least one bit, a bit n in the at least one bit is used to indicate whether the MAC PDU includes data of remote UE whose second identifier is n and that is connected to the relay UE, and n is 0 or an integer greater than or equal to 1, to associate the second identifier of the remote UE with the bit in the bitmap. The LCID of the first radio bearer corresponding to the data is carried in the second MAC subheader in the MAC PDU and sent to the base station, and the data is carried in the MAC SDU in the MAC PDU and sent to the base station. The MAC PDU may further include a fourth MAC subheader, and the fourth MAC subheader includes a MAC CE used to indicate that the MAC CE includes the bitmap.

In this way, the relay UE may use the methods shown in FIG. 4a and FIG. 4b to add the second identifier of the remote UE, the LCID of the first radio bearer corresponding to the data, and the data into the Medium Access Control Protocol data unit MAC PDU, and send the MAC PDU to the base station.

Optionally, in yet another possible implementation of the first aspect, with reference to the first aspect or the possible implementations of the first aspect, the method may further include:

when scheduling uplink data from the remote UE/the relay UE, adding, by the base station, a second identifier of the remote UE or the relay UE that scheduling information is for into downlink control information (DCI) (for example, a DCI format 0) used for scheduling the uplink data, so that the relay UE can determine, based on the second identifier, whether an allocated uplink resource in the downlink control information is used to send data of the relay UE or data of specific remote UE. For example, the relay UE may send, based on the second identifier of the remote UE in the DCI, the data of the remote UE on the resource indicated by the DCI.

FIG. 1 is a schematic diagram of a network architecture according to an embodiment of the present invention, and the network is applicable to a data transmission method provided in this embodiment. As shown in FIG. 1, the network architecture may include: a base station 10, relay UE 20 within coverage of the base station 10, and a plurality of remote UEs 30 connected to the relay UE 20. The base station 10 may be an evolved NodeB (eNB or eNodeB) in LTE, and this is not limited in the present invention. The relay UE 20 may be user equipment (UE), a terminal, a mobile station (MS), or a mobile terminal, or may be an intelligent mobile terminal of a wearer of a wearable device, and this is not limited in the present invention. The relay UE 20 may communicate with the base station 10 by using a radio access network (RAN). The remote UE 30 is characterized by a small size, a small battery capacity, and low power consumption. For example, the remote UE 30 may be a wearable device. The wearable device includes but is not limited to various smart wearable devices such as a smartwatch, a smart band, a smart wrist strap, smart glasses, a smart necklace, a smart ring, smart earrings, and a smartphone. In actual application, the remote UE 30 may communicate with the base station 10 by using the relay UE 20. A communication link between the remote UE 30 and the relay UE 20 may be referred to as a sidelink, and communication may be performed between the remote UE 30 and the relay UE 20 in a manner such as a WLAN or Bluetooth technology, or may be performed based on an LTE sidelink communications technology. This is not limited in this embodiment of the present invention. It should be noted that FIG. 1 is merely a schematic diagram. A quantity of devices in FIG. 1 does not constitute a limitation on the technical solutions provided in the present invention. In an actual deployment process, a quantity of devices different from that shown in FIG. 2 may be deployed.

In this way, the relay UE may send the data to the base station based on a resource that is indicated by the DCI delivered by the base station and that corresponds to the remote UE, so that the base station determines, based on a resource location, specific remote UE that sends the received data.

Optionally, in still yet another possible implementation of the first aspect, with reference to any one of the first aspect or the possible implementations of the first aspect, the relay UE may determine the second identifier of the remote UE based on the first identifier in the following manner 1 or manner 2:

Manner 1: The relay UE receives a connection setup request that is sent by the remote UE to request the relay UE to set up a connection to the remote UE and that includes the first identifier of the remote UE, and sends a notification message that includes the first identifier of the remote UE to the base station;

the relay UE receives a response message that is returned by the base station and that includes a mapping relationship, determined by the base station, between the second identifier and the first identifier of the remote UE, and determines the second identifier of the remote UE and the mapping relationship between the second identifier and the first identifier based on the response message; and the relay UE determines the second identifier of the remote UE based on the second identifier of the remote UE and the mapping relationship between the second identifier and the first identifier.

Manner 2: The relay UE receives a connection setup request that is sent by the remote UE to request the relay UE to set up a connection to the remote UE and that includes the first identifier of the remote UE, determines the second identifier of the remote UE, and establishes a mapping relationship between the second identifier of the remote UE and the first identifier of the remote UE.

Correspondingly, in manner 2, the method may further include:

sending, by the relay UE, the second identifier of the remote UE and/or the mapping relationship between the second identifier and the first identifier to the base station, so that the base station determines the second identifier of the remote UE based on received information.

In this way, the relay UE may determine the second identifier of the remote UE in the foregoing manner 1 or manner 2.

Correspondingly, as an inverse process of a process in which the relay UE sends the data to the base station, when sending data of a plurality of UEs (remote UE or relay UE) to the relay UE, the base station may also send the data of the UE, an identifier of a radio bearer of the UE, and a second identifier of the UE together to the relay UE by using the foregoing method, so that the relay UE determines, based on the received data of the UE, the received identifier of the radio bearer of the UE, and the received second identifier of the UE, specific UE (the relay UE or remote UE connected to the relay UE) to which the data is transmitted. Specific implementation is described in the following second aspect.

According to a second aspect, a data transmission method is provided, where the method is performed by a base station, and the method may include:

sending, to relay UE, a first message that is used to set up at least one first radio bearer used for transmitting, between the base station and the relay UE, data of remote UE connected to the relay UE and that includes a configuration parameter of the at least one first radio bearer, obtaining the data of the remote UE, and determining a second identifier of the remote UE; and determining, by the base station, a first radio bearer corresponding to the data of the remote UE, and sending the data of the remote UE to the relay UE by using the first radio bearer, where an LCID of the first radio bearer and the second identifier of the remote UE are sent together with the data.

A configuration parameter of each of the at least one first radio bearer may include an identifier of the first radio bearer and/or a logical channel identifier LCID corresponding to the first radio bearer.

It should be noted that in a process in which the base station sets up a first radio bearer for remote UE, for same remote UE, one first radio bearer may be configured for data belonging to a same data flow, or one first radio bearer may be configured for data belonging to different data flows. This is not limited in this embodiment of the present invention. However, an identifier or an LCID of a first radio bearer corresponding to same remote UE is unique, and first radio bearers of different remote UEs may have a same identifier or LCID. To be specific, an identifier or an LCID of a radio bearer may be repeatedly used to identify radio bearers of different remote UEs.

In this way, when sending data of a plurality of remote UEs to the relay UE, the base station may add, into the data, a second identifier of the remote UE and an LCID of a radio bearer on which the data of the remote UE is sent. The second identifier of the remote UE and the identifier or the LCID of the radio bearer are sent, so that the relay UE identifies a correspondence between data on a radio bearer and UE.

Optionally, in a possible implementation of the second aspect, with reference to the second aspect, the base station may alternatively send the data of the remote UE, the identifier or the LCID of each radio bearer of the remote UE, and the second identifier of the remote UE to the relay UE by using the solutions shown in FIG. 4a and FIG. 4b, and details are not described herein again.

Optionally, in another possible implementation of the second aspect, with reference to the second aspect or the possible implementation of the second aspect, the method may further include:

when scheduling downlink data to the remote UE/the relay UE, adding, by the base station, a second identifier of the remote UE or the relay UE that the scheduling information is for into DCI (for example, a DCI format 1A) used for scheduling the downlink data, so that the relay UE can determine, based on the second identifier, whether the received downlink data is data sent to the relay UE or data sent to specific remote UE.

It should be noted that, only after the base station configures specific relay UE to start providing a data forwarding service for remote UE, downlink control information sent to the relay UE includes the second identifier. To be specific, when decoding the DCI, the relay UE decodes the DCI based on a quantity of bits included in the DCI that includes the second identifier and a format of the DCI. Otherwise, the relay UE decodes the DCI based on a quantity of bits included in the current DCI and a format of the current DCI. When DCI sent by the base station is used to schedule uplink data transmission of the relay UE, the DCI includes the second identifier, for example, the second identifier may be set to 0000 (it is assumed that an index is represented by 4 bits).

In this way, the relay UE may receive, based on a resource that is indicated by the DCI delivered by the base station and that corresponds to the remote UE, the data sent by the base station, so that the relay UE determines, based on a resource location, specific remote UE to which the received data is transmitted.

Optionally, in a possible implementation of the second aspect, with reference to any one of the second aspect or the possible implementations of the second aspect, the base station may determine the second identifier of the remote UE in the following manner 1 or manner 2:

Manner 1: The base station receives the first identifier of the remote UE that is reported by the remote UE, and establishes a mapping relationship between the first identifier of the remote UE and a C-RNTI of the remote UE; and the base station receives a notification message that is sent by the relay UE and that includes the first identifier of the remote UE, allocates a second identifier to the remote UE, and returns, to the relay UE, a response message that includes the second identifier of the remote UE and a mapping relationship between the second identifier and the first identifier of the remote UE.

Manner 2: The base station receives the first identifier of the remote UE that is reported by the remote UE, and establishes a mapping relationship between the first identifier of the remote UE and a C-RNTI of the remote UE; and the base station receives a notification message that is sent by the relay UE and that includes the second identifier of the remote UE, and returns, to the relay UE, a response message used to instruct the relay UE to provide a connection for the remote UE; and the base station establishes a mapping relationship between the second identifier of the remote UE and the C-RNTI of the remote UE.

In this way, the base station may determine the second identifier of the remote UE in the foregoing manner 1 or manner 2.

According to a third aspect, relay UE is provided, where the relay UE may include:

a receiving unit, configured to receive data of remote UE, where the data includes a first identifier of the remote UE;

a determining unit, configured to determine a second identifier of the remote UE based on the first identifier received by the receiving unit, where the second identifier is a unique identifier of the remote UE on the relay UE; and a sending unit, configured to send, to a base station, the second identifier of the remote UE and the data of the remote UE that is received by the communications interface.

For a specific implementation of the third aspect, refer to behavior and functions of the relay UE in the data transmission method provided in the first aspect or the possible implementations of the first aspect. Details are not described herein again. Therefore, the relay UE provided in the third aspect can achieve a same beneficial effect as the first aspect.

According to a fourth aspect, relay UE is provided, where the relay UE may include:

a communications interface, configured to receive data of remote UE, where the data includes a first identifier of the remote UE; and a processor, configured to determine a second identifier of the remote UE based on the first identifier received by the communications interface, where the second identifier is a unique identifier of the remote UE on the relay UE, where the communications interface is further configured to send, to a base station, the second identifier of the remote UE and the data of the remote UE that is received by the communications interface.

For a specific implementation of the fourth aspect, refer to behavior and functions of the relay UE in the data transmission method provided in the first aspect or the possible implementations of the first aspect. Details are not described herein again. Therefore, the relay UE provided in the fourth aspect can achieve a same beneficial effect as the first aspect.

According to a fifth aspect, the present invention provides a non-volatile computer readable storage medium storing one or more programs, the one or more programs include an instruction, and when the instruction is executed by the relay UE in the third aspect or the fourth aspect or any one of the foregoing possible implementations, the relay UE executes the following events:

receiving data that is of remote UE and that includes a first identifier of the remote UE; determining a second identifier of the remote UE based on the received first identifier, where the second identifier is a unique identifier of the remote UE on the relay UE; and sending, to a base station, the second identifier of the remote UE and the data of the remote UE that is received by the communications interface.

For a specific implementation of the fifth aspect, refer to behavior and functions of the relay UE in the data transmission method provided in the first aspect or the possible implementations of the first aspect. Details are not described herein again. Therefore, the relay UE provided in the fifth aspect can achieve a same beneficial effect as the first aspect.

According to a sixth aspect, a base station is provided, where the base station may include:

a sending unit, configured to send, to relay UE, a first message that is used to set up at least one first radio bearer used for transmitting, between the base station and the relay UE, data of remote UE connected to the relay UE and that includes a configuration parameter of the at least one first radio bearer;

a receiving unit, configured to the data of the remote UE; and a determining unit, configured to: determine a second identifier of the remote UE, and determine a first radio bearer corresponding to the data of the remote UE, where the sending unit is further configured to send the data of the remote UE to the relay UE by using the first radio bearer, where an LCID of the first radio bearer and the second identifier of the remote UE are sent together with the data.

For a specific implementation of the sixth aspect, refer to behavior and functions of the base station in the data transmission method provided in the second aspect or the possible implementations of the second aspect. Details are not described herein again. Therefore, the base station provided in the sixth aspect can achieve a same beneficial effect as the second aspect.

According to a seventh aspect, a base station is provided, where the base station may include:

a communications interface, configured to send, to relay UE, a first message that is used to set up at least one first radio bearer used for transmitting, between the base station and the relay UE, data of remote UE connected to the relay UE and that includes a configuration parameter of the at least one first radio bearer, where the communications interface is further configured to obtain the data of the remote UE; and a processor, configured to: determine a second identifier of the remote UE, and determine a first radio bearer corresponding to the data of the remote UE, where the communications interface is further configured to send the data of the remote UE to the relay UE by using the first radio bearer, where an LCID of the first radio bearer and the second identifier of the remote UE are sent together with the data.

For a specific implementation of the seventh aspect, refer to behavior and functions of the base station in the data transmission method provided in the second aspect or the possible implementations of the second aspect. Details are not described herein again. Therefore, the base station provided in the seventh aspect can achieve a same beneficial effect as the second aspect.

According to a fifth aspect, the present invention provides a non-volatile computer readable storage medium storing one or more programs, the one or more programs include an instruction, and when the instruction is executed by the relay UE in the third aspect or the fourth aspect or any one of the foregoing possible implementations, the relay UE executes the following events:

sending, to relay UE, a first message that is used to set up at least one first radio bearer used for transmitting, between the base station and the relay UE, data of remote UE connected to the relay UE and that includes a configuration parameter of the at least one first radio bearer; obtaining the data of the remote UE; determining a second identifier of the remote UE; determining a first radio bearer corresponding to the data of the remote UE; and sending the data of the remote UE to the relay UE by using the first radio bearer, where an LCID of the first radio bearer and the second identifier of the remote UE are sent together with the data.

For a specific implementation of the eighth aspect, refer to behavior and functions of the base station in the data transmission method provided in the second aspect or the possible implementations of the second aspect. Details are not described herein again. Therefore, the base station provided in the eighth aspect can achieve a same beneficial effect as the second aspect.

According to a ninth aspect, a data transmission system is provided, including remote UE, the relay UE according to the third aspect, the fourth aspect, the fifth aspect, or any one of the foregoing possible implementations, and the base station according to the sixth aspect, the seventh aspect, the eighth aspect, or any one of the foregoing possible implementations.

The system described in the ninth aspect is configured to implement the data transmission method shown in the first aspect or the second aspect, and therefore can achieve a same beneficial effect as the foregoing data transmission method. Details are not described herein again.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may derive other drawings from these accompanying drawings without creative efforts.

DESCRIPTION OF EMBODIMENTS

Principles of the present invention are as follows: An identifier is configured for each remote UE connected to relay UE, and the identifier is a unique identifier of the remote UE on the relay UE. When forwarding data of the remote UE to a base station, the relay UE also sends the identifier of the remote UE to the base station, so that the base station determines, based on the identifier of the remote UE, specific remote UE that is connected to the relay UE and from which the received data comes. For example, the relay UE may send received data sent by remote UE 1 and an identifier of the remote UE 1 together to the base station.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

In the descriptions of the present invention, it should be understood that a system or an element indicated by the term "first", "second", "another", or the like is a system or an element that has a specific function and that is described based on the embodiments, and is merely intended to help describe the present invention and simplify descriptions, and does not indicate or imply that the system or element needs to have such a name, and therefore should not be construed as a limitation on the present invention.

Before the solutions are described in detail, for ease of understanding of the technical solutions in the present invention, some important nouns in the present invention are explained in detail. It should be understood that the following nouns are merely names provided by the technical personnel of the present invention for ease of description, and do not represent or imply that the system or element needs to have such a name, and therefore should not be construed as a limitation on the present invention.

Figure 1:
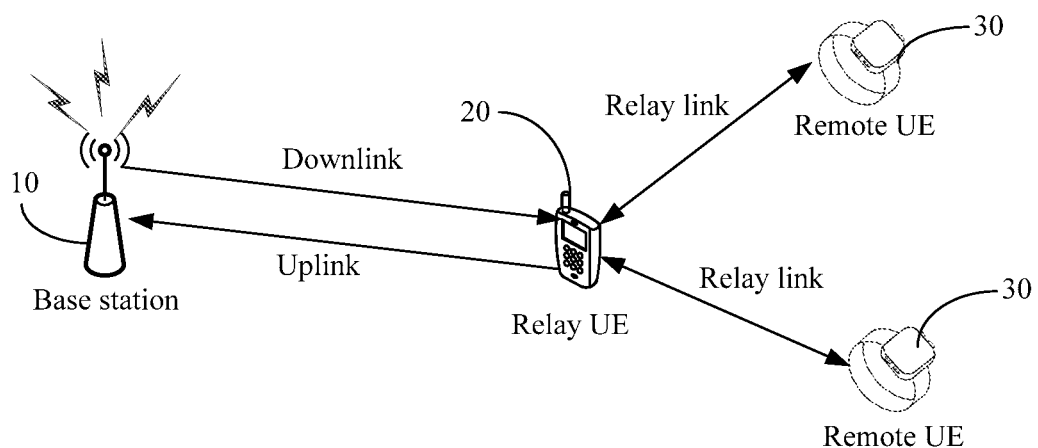
FIG. 1 is a schematic diagram of a network architecture according to an embodiment of the present invention.

FIG. 1 is a schematic diagram of a network architecture according to an embodiment of the present invention, and the network is applicable to a data transmission method provided in this embodiment. As shown in FIG. 1, the network architecture may include: a base station 10, relay UE 20 within coverage of the base station 10, and a plurality of remote UEs 30 connected to the relay UE 20. The base station 10 may be an evolved NodeB (English: Evolved NodeB, eNB or eNodeB) in LTE, and this is not limited in the present invention. The relay UE 20 may be user equipment (English: User Equipment, UE), a terminal (Terminal), a mobile station (English: Mobile Station, MS), or a mobile terminal (Mobile Terminal), or may be an intelligent mobile terminal of a wearer of a wearable device, and this is not limited in the present invention. The relay UE 20 may communicate with the base station 10 by using a radio access network (English: Radio Access Network, RAN). The remote UE 30 is characterized by a small size, a small battery capacity, and low power consumption. For example, the remote UE 30 may be a wearable device. The wearable device includes but is not limited to various smart wearable devices such as a smartwatch, a smart band, a smart wrist strap, smart glasses, a smart necklace, a smart ring, smart earrings, and a smartphone. In actual application, the remote UE 30 may communicate with the base station 10 by using the relay UE 20. A communication link between the remote UE 30 and the relay UE 20 may be referred to as a sidelink, and communication may be performed between the remote UE 30 and the relay UE 20 in a manner such as a WLAN or Bluetooth technology, or may be performed based on an LTE sidelink communications technology. This is not limited in this embodiment of the present invention. It should be noted that FIG. 1 is merely a schematic diagram. A quantity of devices in FIG. 1 does not constitute a limitation on the technical solutions provided in the present invention. In an actual deployment process, a quantity of devices different from that shown in FIG. 2 may be deployed.

Figure 2:
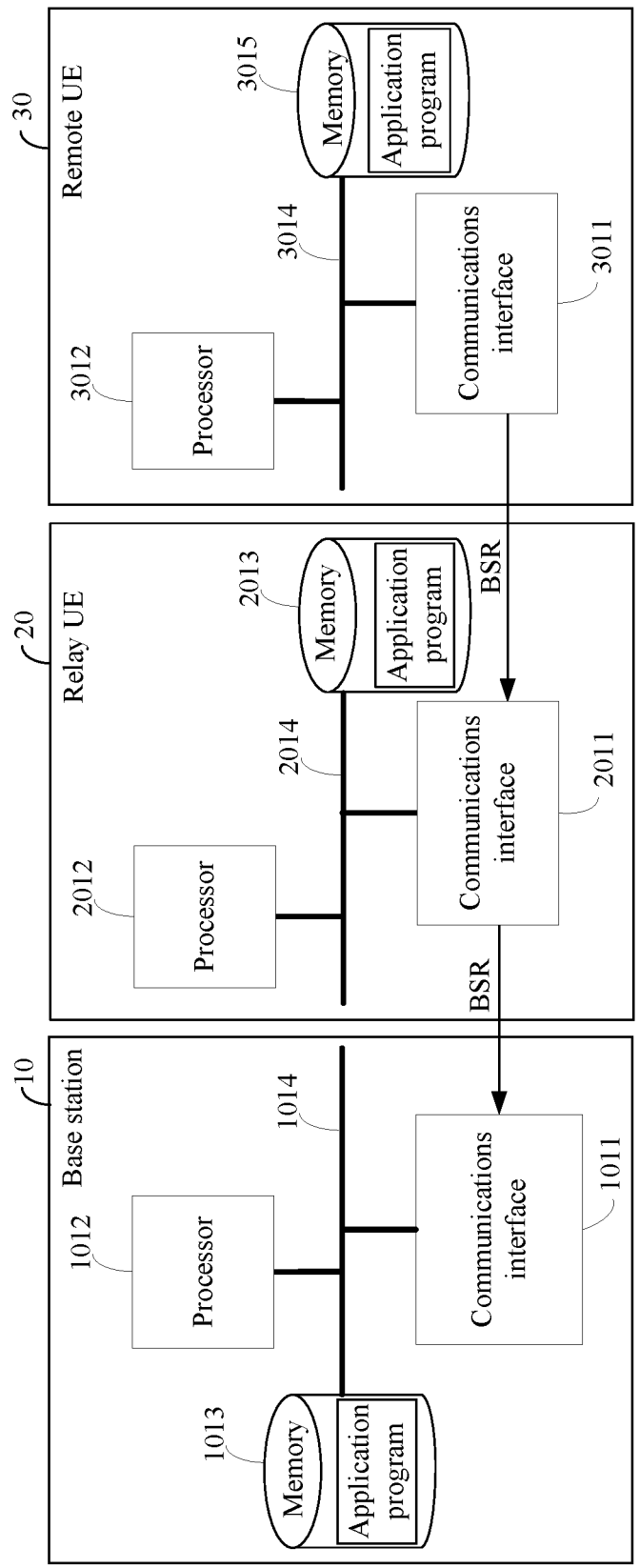
FIG. 2 is a schematic diagram of another network architecture according to an embodiment of the present invention.

Specifically, as shown in FIG. 2, the base station 10 may include: a communications interface 1011, a processor 1012, a memory 1013, and at least one communications bus 1014 that is configured to implement connection and mutual communication between these apparatuses. The relay UE 20 may include a communications interface 2011, a processor 2012, a memory 2013, and at least one communications bus 2014 that is configured to implement connection and mutual communication between these apparatuses. The remote UE 30 may include a communications interface 3011, a processor 3012, a memory 3013, and at least one communications bus 3014 that is configured to implement connection and mutual communication between these apparatuses.

The communications interface 1011, the communications interface 2011, and the communications interface 3011 each may be implemented by an antenna, and may be configured to exchange data with an external network element. For example, the communications interface 1011 of the base station 10 may receive/send a data packet or resource request information between the base station 10 and the relay UE 20. The communications interface 2011 of the relay UE 20 may receive/send a data packet or resource request information between the relay UE 20 and UE or the base station 10 or the remote UE 30. For example, the communications interface 3011 may send data and other information of the remote UE 30 to the communications interface 2011. After receiving the data or the other information, the communications interface 2011 sends the data or the other information to the communications interface 1011 by using a radio bearer between the relay UE 20 and the base station, and the base station 10 processes the data and the other information.

The processor 1012, the processor 2012, and the processor 3012 each may be a (CPU), or may be an application-specific integrated circuit (ASIC), or may be configured as one or more integrated circuits that are configured to implement this embodiment of the present invention. For example, the processor 1012, the processor 2012, and the processor 3012 each are one or more microprocessors (DSP), or one or more field programmable gate arrays (FPGA). The processor 1012, the processor 2012, and the processor 3012 each have a processing and management function. Specifically, the processor 1012 may process received data or information sent by the relay UE 20; the processor 2012 may process received data or information sent by the remote UE 30; and the processor 3012 may process data or information generated by the remote UE 30, or process information or data sent by another device.

The memory 1013, the memory 2013, and the memory 3013 each may be a volatile memory (volatile memory) such as a random access memory (RAM), or may be a non-volatile memory such as a read-only memory (ROM), a flash memory, a hard disk drive (hard disk drive, HDD), or a solid-state drive (SSD), or may be a combination of the foregoing types of memories. Specifically, the memory 1013, the memory 2013, and the memory 3013 each may store data or program code supporting the data transmission method in the embodiments of the present invention, so that the processor 1012, the processor 2012, and the processor 3012 each perform, based on data or program code stored in memories of respective devices, the data transmission method provided in the embodiments of the present invention.

The communications bus 1014, the communications bus 2014, and the communications bus 3013 each may be classified into an address bus, a data bus, a control bus, and the like, and each may be an industry standard architecture (ISA) bus, a peripheral component interconnect (PCI) bus, an extended industry standard architecture (EISA) bus, or the like. For ease of representation, only one line is used to represent the bus in FIG. 2, but this does not mean that there is only one bus or only one type of bus.

The first identifier may be a layer 2 address (Layer 2 ID) of the remote UE. If a technology used for communication between the remote UE and the relay UE is an LTE sidelink technology, the first identifier may be a user equipment identifier that is of the remote UE and is used for device-to-device communication, for example, may be a service user equipment identifier (ProSe UE ID) of the remote UE. If a technology used for communication between the remote UE and the relay UE is a Bluetooth or wireless local area network (WLAN) technology, the first identifier may be a source Medium Access Control (MAC) address of the remote UE.

The first identifier may be a layer 2 address (Layer 2 ID) of the remote UE. If a technology used for communication between the remote UE and the relay UE is an LTE sidelink (Sidelink) technology, the first identifier may be a user equipment identifier that is of the remote UE and is used for device-to-device communication, for example, may be a service user equipment identifier (ProSe UE ID) of the remote UE. If a technology used for communication between the remote UE and the relay UE is a Bluetooth or wireless local area network (English: Wireless Local Area Network, WLAN) technology, the first identifier may be a source Medium Access Control (English: Medium Access Control, MAC) address of the remote UE.

The second identifier may be referred to as a remote UE index (Remote UE Index) or a remote UE ID, is a unique identifier of the remote UE for connecting the remote UE to the relay UE, and may be represented by a plurality of bits. A quantity of bits used to represent the remote UE index depends on a maximum quantity of remote UEs that can be connected to the relay UE. For example, if the relay UE can be connected to a maximum of four remote UEs, 2 bits may be used to represent the remote UE index. For example, for same remote UE, an index for connecting the remote UE to the relay UE 1 may be a remote UE index 1, and an index for connecting the remote UE to the relay UE 2 may be a remote UE index 2.

For ease of description, in the following embodiments, that the first identifier is the layer 2 ID of the remote UE and the second identifier is the remote UE index is used as an example, to show and describe in detail a process of the data transmission method provided in the present invention. Shown steps may also be performed in a computer system that can execute a group of instructions. In addition, although a logical sequence is shown in the figure, in some cases, the shown or described steps may be performed in a sequence different from the logical sequence herein.

Figure 3:
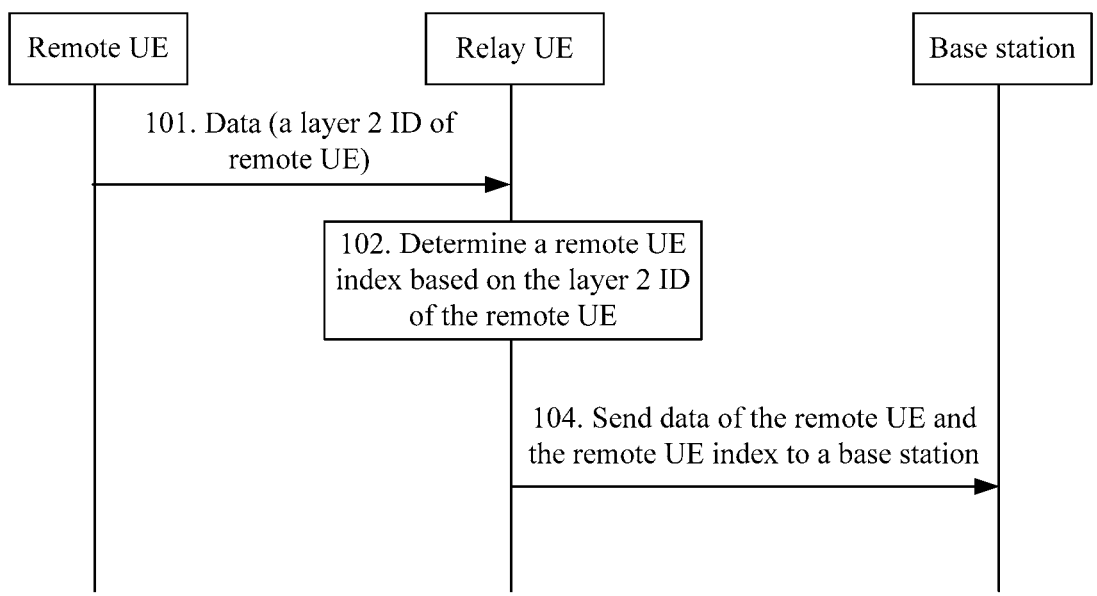
FIG. 3 is a flowchart of a data transmission method according to an embodiment of the present invention.

FIG. 3 is a flowchart of a data transmission method according to an embodiment of the present invention. The method is performed by devices shown in FIG. 1 or FIG. 2 through interaction. The method may be applied to a scenario in which relay UE sends, to a base station, data of at least one remote UE that is received by the relay UE. As shown in FIG. 3, the method may include the following steps.

101. Relay UE receives data of remote UE, where the data includes a layer 2 ID of the remote UE.

The remote UE may be any remote UE connected to the relay UE, and the relay UE may receive, by using a sidelink, a WLAN link, or a Bluetooth link between the relay UE and the remote UE, the data sent by the remote UE.

102. The relay UE determines a remote UE index based on the layer 2 ID of the remote UE.

Optionally, for a process in which the relay UE determines the remote UE index, refer to a solution subsequently shown in FIG. 6, FIG. 7, or FIG. 8.

103. The relay UE sends the data of the remote UE and the remote UE index to a base station.

In this way, the relay UE may send the data of the remote UE and the remote UE index together to the base station, so that the base station determines, based on the remote UE index, specific remote UE that is connected to the relay UE and from which the received data comes.

Figure 3A:
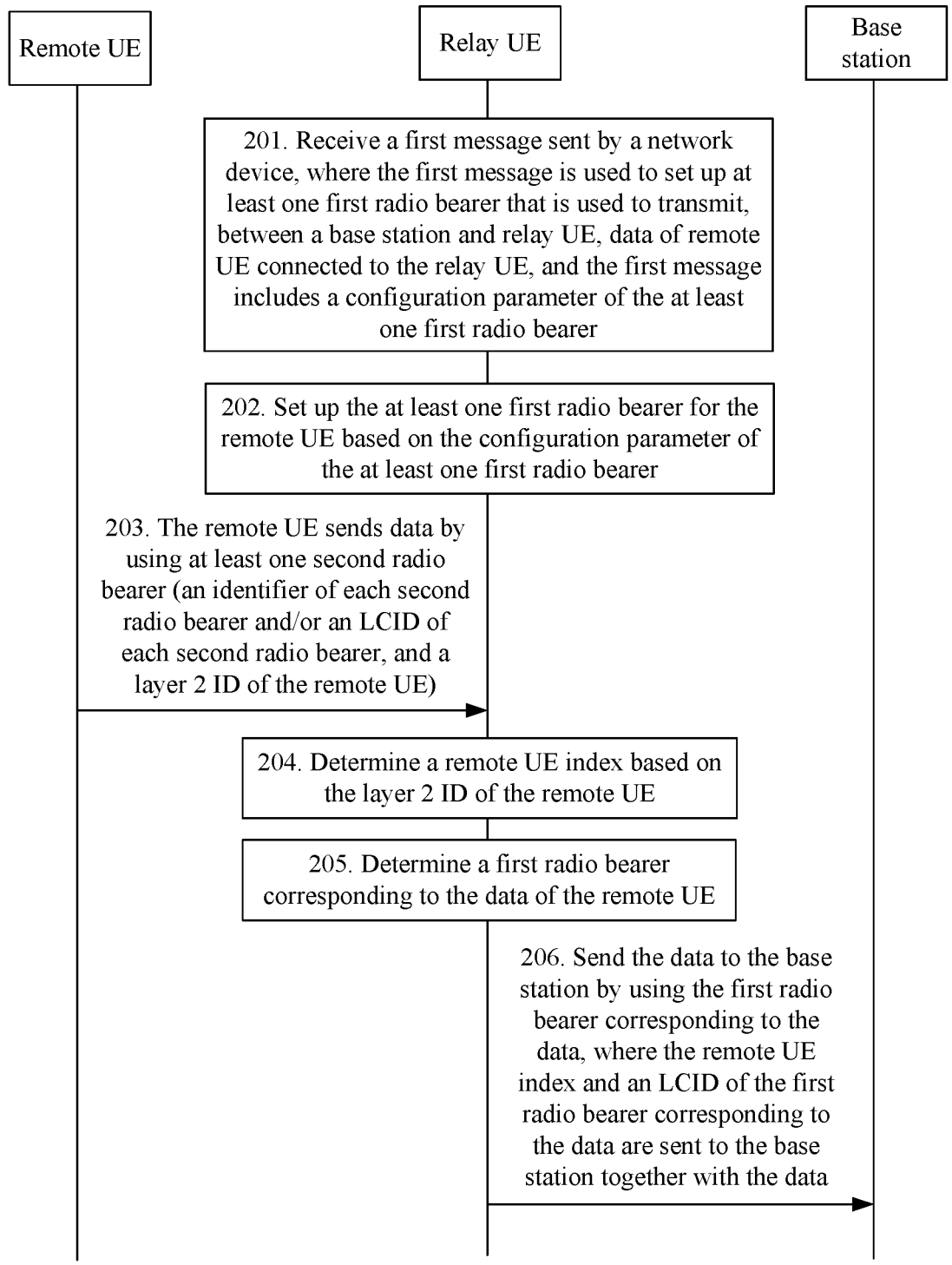
FIG. 3a is a flowchart of a data transmission method according to an embodiment of the present invention.

In another feasible solution of this embodiment of the present invention, when the relay UE sends the data of the remote UE to the base station, the relay UE may set up a plurality of radio bearers for the remote UE and send the data to the base station by using the radio bearers. In addition, to avoid a prior-art problem that a radio bearer identifier or an LCID value used to identify a radio bearer is limited, during radio bearer setup, a unique radio bearer identifier and/or LCID is configured for a radio bearer of same remote UE, and a same radio bearer identifier and/or logical channel identifier is configured for first radio bearers of different remote UEs. Specifically, an implementation is shown in FIG. 3a, and may include the following steps.

201. The relay UE receives a first message sent by a network device, where the first message is used to set up at least one first radio bearer that is used to transmit, between the base station and the relay UE, the data of the remote UE connected to the relay UE, and the first message includes a configuration parameter of the at least one first radio bearer.

The network device may be a base station, and a configuration parameter of each of the at least one first radio bearer includes an identifier of the first radio bearer and/or a logical channel identifier LCID corresponding to the first radio bearer.

202. The relay UE sets up the at least one first radio bearer for the remote UE based on the configuration parameter of the at least one first radio bearer.

The first radio bearer is a radio bearer that is used to transmit, between the relay UE and the base station, the data of the remote UE connected to the relay UE. A process in which the relay UE sets up the first radio bearer based on the configuration parameter of the first radio bearer belongs to the prior art, and details are not described herein.

Step 203. The relay UE receives data that is sent by the remote UE by using at least one second radio bearer, where the data carries an identifier of each second radio bearer and/or an LCID of each second radio bearer, and the layer 2 ID of the remote UE.

204. The relay UE determines the remote UE index based on the layer 2 ID of the remote UE.

Optionally, for a process in which the relay UE determines the remote UE index, refer to a solution subsequently shown in FIG. 6, FIG. 7, or FIG. 8.

205. The relay UE determines a first radio bearer corresponding to the data of the remote UE.

Optionally, the relay UE may determine, based on the identifier of the second radio bearer and/or the LCID of each second radio bearer that are/is received in step 203, the first radio bearer corresponding to the data of the remote UE.

206. The relay UE sends the data to the base station by using the first radio bearer corresponding to the data, where the remote UE index and an LCID of the first radio bearer corresponding to the data are sent to the base station together with the data.

Optionally, for the remote UE, in a process of setting up the first radio bearer for the data sent by the remote UE, one radio bearer may be correspondingly set up for each data flow that includes a plurality of pieces of data, and each radio bearer may correspondingly transmit a plurality of pieces of data on a data flow. In addition, to resolve a problem that an existing LCID has limited values, radio bearer identifiers and/or LCIDs of radio bearers of different remote UEs may be the same, and different radio bearers of same remote UE may have different radio bearer identifiers and/or LCIDs.

For example, if remote UE 1 has three data flows and remote UE 2 has two data flows, the base station may configure, for the relay UE, three first radio bearers that are respectively used to transmit data in the three data flows of the remote UE 1, where radio bearer IDs (DRB ID) and associated logical channel IDs of the three first radio bearers are respectively as follows: a radio bearer whose DRB ID=1/LCID=1, a radio bearer whose DRB ID=2/LCID=2, and a radio bearer whose DRB ID/LCID=3; and configure, for the relay UE, two second radio bearers that are respectively used to transmit data in the two data flows of the remote UE 2, where radio bearer IDs and associated logical channel IDs of the two second radio bearers are respectively as follows: a radio bearer whose DRB ID=1/LCID=1, and a radio bearer whose DRB ID=2/LCID=2. Therefore, a data flow sent by each remote UE is transmitted to the base station by using a corresponding first radio bearer.

It should be noted that, when sending the received data of the remote UE to the base station, the relay UE may further send data of the relay UE, and this is not limited in this embodiment of the present invention. To be specific, in the present invention, the solution shown in FIG. 3*a* may be used to send data of a plurality of UEs (the remote UE or the relay UE) to the base station. However, regardless of data of which UE (the remote UE or the relay UE) is sent, only an index used to identify UE and an LCID used to identify a corresponding radio bearer need to be carried when the data is sent, so that the base station can identify, after receiving the data, that the data is sent on which radio bearer of which UE.

In this way, when sending data of a plurality of remote UEs to the base station, the relay UE may add, into the data, remote UE indexes and LCIDs of radio bearers corresponding to the data of the remote UE, to avoid, through repeated use of the LCID, a prior-art problem that an LCID has limited values. In addition, the remote UE index is sent to identify specific remote UE that sends data on radio bearers with a same LCID.

Optionally, in step 206, if the remote UE has N radio bearers and the relay UE sends data to the base station by using each radio bearer, the relay UE may send the data of the remote UE, an LCID of each radio bearer of the remote UE, and the remote UE index to the base station by using the following solutions ( 1.1) to ( 1.5), where N is an integer greater than or equal to 1.

Solution (1.1): When scheduling uplink data from the remote UE/the relay UE, the base station adds an index of the remote UE or the relay UE that scheduling information is for into downlink control information (DCI) (for example, a DCI format 0) used for scheduling the uplink data, so that the relay UE may determine, based on the index, whether an allocated uplink resource in the downlink control information is used to send data of the relay UE or data of specific remote UE. For example, the relay UE may send, based on the remote UE index in the DCI, the data of the remote UE on the resource indicated by the DCI.

It should be noted that, only after the base station configures specific relay UE to start providing a data forwarding service for remote UE, downlink control information sent to the relay UE includes the index. To be specific, when decoding the DCI, the relay UE decodes the DCI based on a quantity of bits in the DCI that includes the index and a format of the DCI. Otherwise, the relay UE decodes the DCI based on a quantity of bits included in the current DCI and a format of the current DCI. When DCI sent by the base station is used to schedule uplink data transmission of the relay UE, the DCI includes the index, for example, the index may be set to 0000 (it is assumed that the index is represented by 4 bits).

Solution (1.2): The data of the remote UE, the LCD of each radio bearer that carries the data of the remote UE, and the remote UE index are added into a Medium Access Control protocol data unit (MAC PDU), and sent to the base station.

The MAC PDU may include a Medium Access Control header (MAC Header) and a plurality of Medium Access Control service data units (MAC SDU). The plurality of MAC SDUs include N MAC SDUs that are in a one-to-one correspondence with the N radio bearers of the remote UE. Each of the N MAC SDUs may include data on a radio bearer corresponding to the MAC SDU, that is, data on each radio bearer of the remote UE is correspondingly added into the MAC SDU.

The MAC header may include a plurality of Medium Access Control subheaders (MAC Subheader), the plurality of MAC subheaders may include a first MAC subheader and N second MAC subheaders, and N second MAC subheaders are in a one-to-one correspondence with the N radio bearers.

The first MAC subheader may include the remote UE index.

Each of the N second MAC subheaders may include an LCID. The LCID included in the second MAC subheader is used to identify a radio bearer corresponding to the second MAC subheader and to indicate a MAC SDU corresponding to the radio bearer.

It can be learned from the foregoing description that, in the solution ( 1.2), data on the plurality of radio bearers corresponding to the remote UE is respectively added into the plurality of MAC SDUs and sent to the base station. In addition, the MAC subheaders include a MAC subheader that corresponds to the remote UE and that includes the remote UE index and a MAC subheader that includes an LCID of a radio bearer.

Figure 4A:
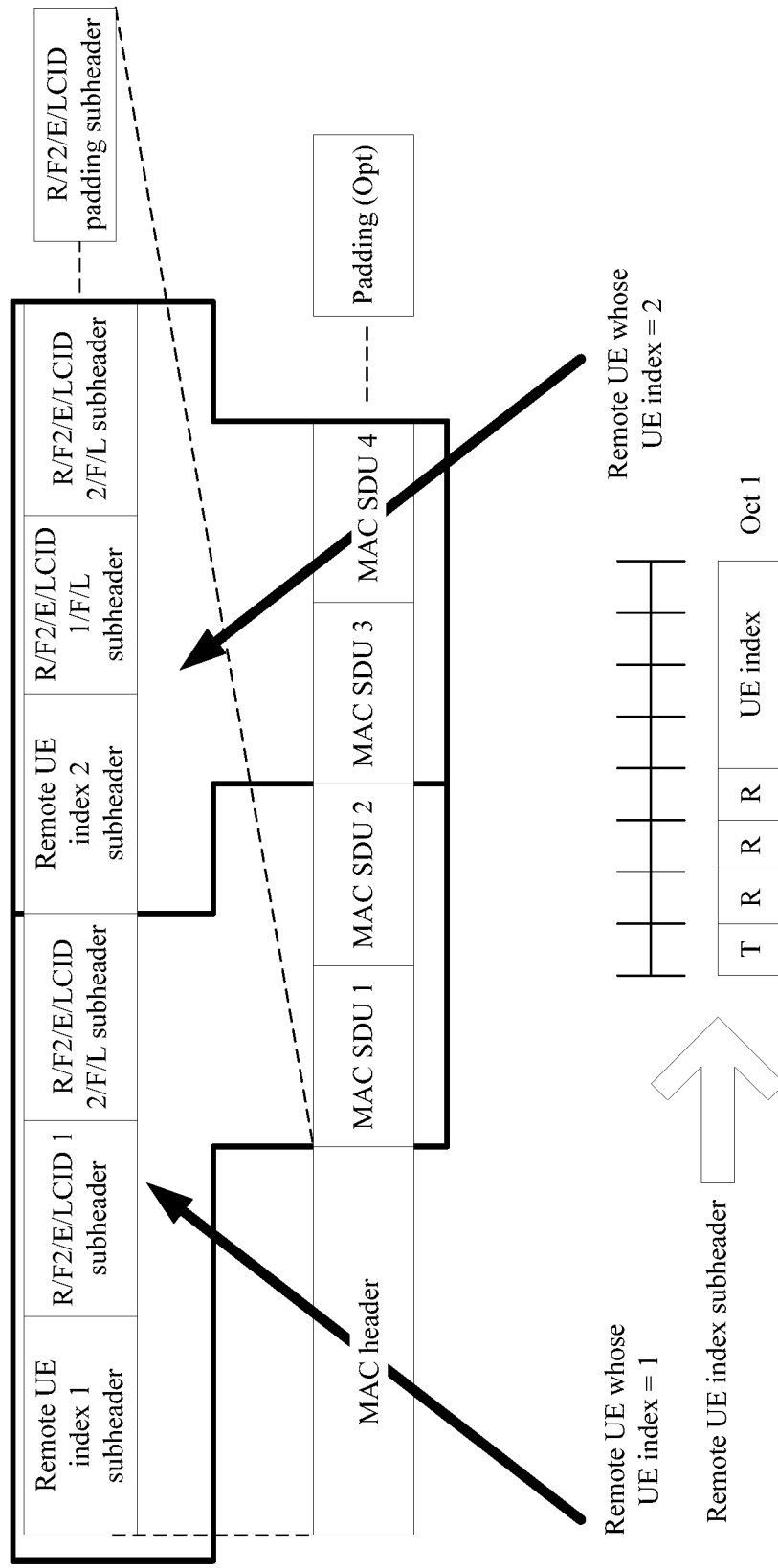
FIG. 4a is a schematic structural diagram of a MAC PDU according to the present invention.

For example, as shown in FIG. 4*a*, if the relay UE receives data 1 and data 2 that are sent by remote UE 1 and data 1 and data 2 that are sent by remote UE 2, and the relay UE respectively sets up radio bearers for the data 1 and the data 2 that are sent by the remote UE 1: a radio bearer whose logical channel identifier LCID is configured as an LCID 1, and a radio bearer whose logical channel identifier LCID is configured as an LCID 2, and respectively sets up radio bearers for the data 1 and the data 2 that are sent by the remote UE 2: a radio bearer whose logical channel identifier LCID is configured as the LCID 1, and a radio bearer whose logical channel identifier LCID is configured as the LCID 2, the relay UE respectively fills, into a MAC SDU 1 and a MAC SDU 2, the received data 1 and the received data 2 that are sent by the remote UE 1; respectively fills, into a MAC SDU 3 and a MAC SDU 4, the data 1 and the data 2 that are sent by the remote UE 2; fills an index of the remote UE 1, namely, a remote UE index 1, into a MAC subheader 1 in a MAC PDU; fills the LCID 1 into a MAC subheader 2; fills the LCID 2 into a MAC subheader 3, fills the index of the remote UE 1, namely, the remote UE index 1, into a MAC subheader 4 in the MAC PDU; fills the LCID 1 into a MAC subheader 5; and fills the LCID 2 into a MAC subheader 6.

It should be noted that, in the solution (1.2), as shown in FIG. 4*a*, the MAC subheader into which the remote UE index is filled may include other bits in addition to the remote UE index, such as a T bit and a reserved (R) bit. A value of the T bit may be used to indicate whether a next MAC subheader adjacent to the MAC subheader is a newly defined subheader including a UE index or a subheader similar to a subheader that includes an LCD and that is defined in an existing uplink/downlink MAC PDU. In addition, as shown in FIG. 4*a*, the MAC PDU may further include a Medium Access Control control element (MAC CE) and padding. The MAC header may further include a MAC subheader corresponding to the MAC CE and a padding subheader corresponding to the padding. This is not limited in this embodiment of the present invention.

In addition, currently, there are two reserved bits in the MAC subheader that includes the LCID. One reserved bit may be used to indicate whether a next MAC subheader adjacent to the MAC subheader is a newly defined subheader that includes a remote UE Index or a subheader similar to a subheader that includes an LCID and that is defined in an existing uplink/downlink MAC PDU.

Solution (1.3): The data of the remote UE, the LCID of each radio bearer that carries the data of the remote UE, and the remote UE index are added into a MAC PDU and sent to the base station.

The MAC PDU may include a MAC header, a MAC CE, and at least one MAC SDU. The at least one MAC SDU may include N MAC SDUs corresponding to the remote UE.

The MAC CE may include the remote UE index.

The N MAC SDUs are in a one-to-one correspondence with the N radio bearers of the remote UE. Each MAC SDU may include data on a radio bearer corresponding to the MAC SDU, that is, data on each radio bearer of the remote UE is correspondingly added into the MAC SDU.

To indicate a first MAC CE that includes the remote UE index and a second MAC SDU that includes data on a radio bearer of the remote UE, the MAC header may correspondingly include at least one MAC subheader. The at least one MAC subheader may include a third MAC subheader and N MAC subheaders. The N MAC subheaders are in a one-to-one correspondence with the N radio bearers. The third MAC subheader may include an LCID used to indicate that the MAC CE includes the remote UE index. Each of the N MAC subheaders may include an LCID used to identify a radio bearer corresponding to the MAC subheader and to indicate a MAC SDU corresponding to the radio bearer.

It can be learned from the foregoing description that, in the solution (1.3), for any remote UE, a remote UE index and data on a radio bearer of the remote UE are separately added into a MAC SDU and sent to the base station. In addition, the MAC subheaders include a plurality of MAC subheaders corresponding to the remote UE, and a MAC subheader in the plurality of MAC subheaders that includes an LCID is used to indicate a MAC SDU that includes the remote UE index and a MAC SDU that includes the data of the remote UE.

Figure 4B:
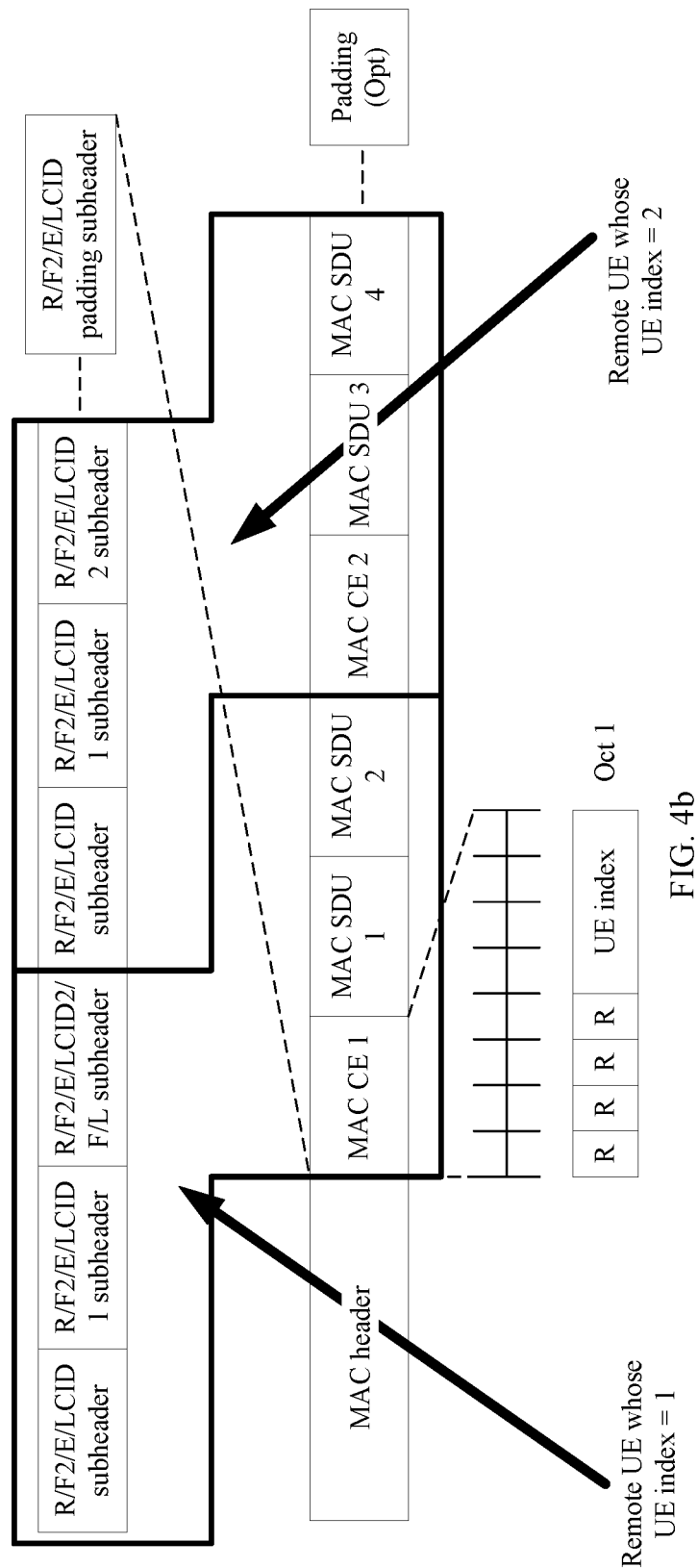
FIG. 4b is a schematic structural diagram of a MAC PDU according to the present invention.

For example, as shown in FIG. 4b, if the relay UE receives, at the same time, data 1 and data 2 that are sent by remote UE 1 and data 1 and data 2 that are sent by remote UE 2, and the relay UE respectively sets up radio bearers for the data 1 and the data 2 that are sent by the remote UE 1: a radio bearer whose logical channel identifier LCID is configured as an LCID 1, and a radio bearer whose logical channel identifier LCID is configured as an LCID 2, and respectively sets up radio bearers for the data 1 and the data 2 that are sent by the remote UE 2: a radio bearer whose logical channel identifier LCID is configured as the LCID 1, and a radio bearer whose logical channel identifier LCID is configured as the LCID 2, the relay UE fills an index of the remote UE 1 into a MAC CE 1; respectively fills, into a MAC SDU 1 and a MAC SDU 2, the data 1 and the data 2 that are sent by the remote UE 1; fills an index of the remote UE 2 into a MAC CE 2; respectively fills, into a MAC SDU 3 and a MAC SDU 4, the data 1 and the data 2 that are sent by the remote UE 2; fills, into a MAC subheader 1 in the MAC PDU, an LCID used to indicate that the MAC CE 1 includes the remote UE index; fills the LCID 1 into a MAC subheader 2; fills the LCID 2 into a MAC subheader 3; fills, into a MAC subheader 4 in the MAC PDU, an LCID used to indicate that the MAC CE 2 includes the remote UE index; fills the LCID 1 into a MAC subheader 5; and fills the LCID 2 into a MAC subheader 6.

It should be noted that, in the solution (1.3), as shown in FIG. 4b, the MAC SDU into which the remote UE index is filled may include another bit in addition to the remote UE index, for example, a reserved (R) bit. The MAC subheader into which the LCID is added may include other bits in addition to the LCID, such as R, E, F, and F2 bits. In addition, as shown in FIG. 4b, the MAC PDU may further include padding (Padding), and the MAC header may further include a MAC subheader corresponding to the MAC CE and a padding subheader corresponding to the padding. This is not limited in this embodiment of the present invention.

Optionally, to support a MAC CE that is indicated by an LCID and that includes a remote UE index, one of a reserved value of an LCID currently used by a downlink shared channel (DL-SCH) and a reserved value of an LCID currently used by an uplink shared channel (UL-SCH) may be selected as a value of an LCID used to indicate the MAC CE that includes the remote UE index. For example, on the downlink shared channel, as shown in the following Table 1, 10111 may be used to indicate the MAC CE that includes the remote UE index. Indication functions of other LCID values are still the same as those in the prior art, and details are not described herein. On the uplink shared channel, as shown in the following Table 2, 10101 may be used to indicate the MAC CE that includes the remote UE index. Indication functions of other LCID values are still the same as those in the prior art, and details are not described herein.

TABLE 1

| Index | LCID values |
| --- | --- |
| 00000 | CCCH |
| 00001-01010 | Identity of the logical channel |
| 01011-10110 | Reserved |
| 10111 | Remote UE Index |
| 11000 | Activation/Deactivation (4 octets) |
| 11001 | SC-MCCH, SC-MTCH (see note) |
| 11010 | Long DRX Command |
| 11011 | Activation/Deactivation (1 octet) |
| 11100 | UE Contention Resolution Identity |
| 11101 | Timing Advance Command |
| 11110 | DRX Command |
| 11111 | Padding |

TABLE 2

| Index | LCID values |
| --- | --- |
| 00000 | CCCH |
| 00001-01010 | Identity of the logical channel |
| 01011 | CCCH |
| 01100-10100 | Reserved |
| 10101 | Remote UE Index |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Solution (1.4): The data of the remote UE, the LCID of each radio bearer that carries the data of the remote UE, and the remote UE index are added into a MAC PDU and sent to the base station.

The MAC PDU may include a MAC header and N MAC SDUs.

The N MAC SDUs are in a one-to-one correspondence with the N radio bearers. Each MAC SDU may include data on a radio bearer corresponding to the MAC SDU, that is, data on each radio bearer of the remote UE is correspondingly added into the MAC SDU and sent to the base station.

To indicate specific remote UE that has data and a MAC SDU that includes the data of the remote UE, in the solution (1.4), the MAC header may include a MAC subheader that includes a bitmap (bitmap) and N MAC subheaders that are in a one-to-one correspondence with the N MAC SDUs.

The bitmap included in the MAC subheader includes at least one bit that is in a one-to-one correspondence with at least one remote UE, a bit n in the at least one bit is used to indicate whether the MAC PDU includes data of remote UE whose second identifier is n and that is connected to the relay UE, and n is 0 or an integer greater than or equal to 1. A quantity of bits in the bitmap depends on a maximum quantity of remote UEs that can be connected to the relay UE. In the solution (1.4), for example, the bitmap may include 16 bits, an nth bit corresponds to remote UE whose index is n, a number "1" is used to indicate that the MAC PDU includes data of the remote UE corresponding to the bit, and a number "0" is used to indicate that the MAC PDU does not include the data of the remote UE corresponding to the bit. In addition, another value may be used for the bit to indicate whether the MAC PDU includes the data of the remote UE corresponding to the bit. This is not limited in the present invention.

Each of the N MAC subheaders includes an LCID, and the LCID is used to identify a radio bearer corresponding to the MAC subheader, and is used to indicate that a MAC SDU corresponding to the LCID is a MAC SDU that includes data on a radio bearer corresponding to the MAC SDU.

It can be learned from the foregoing description that, in the solution (1.4), data on a plurality of radio bearers of the remote UE is added into a plurality of MAC SDUs in a one-to-one manner and sent to the base station. In addition, a MAC subheader that includes a bitmap and that is in the MAC subheaders is used to indicate specific remote UE whose data is carried in the MAC PDU, and a MAC subheader that includes an LCID is used to identify a radio bearer and a MAC SDU that carries data on the radio bearer.

Figure 4C:
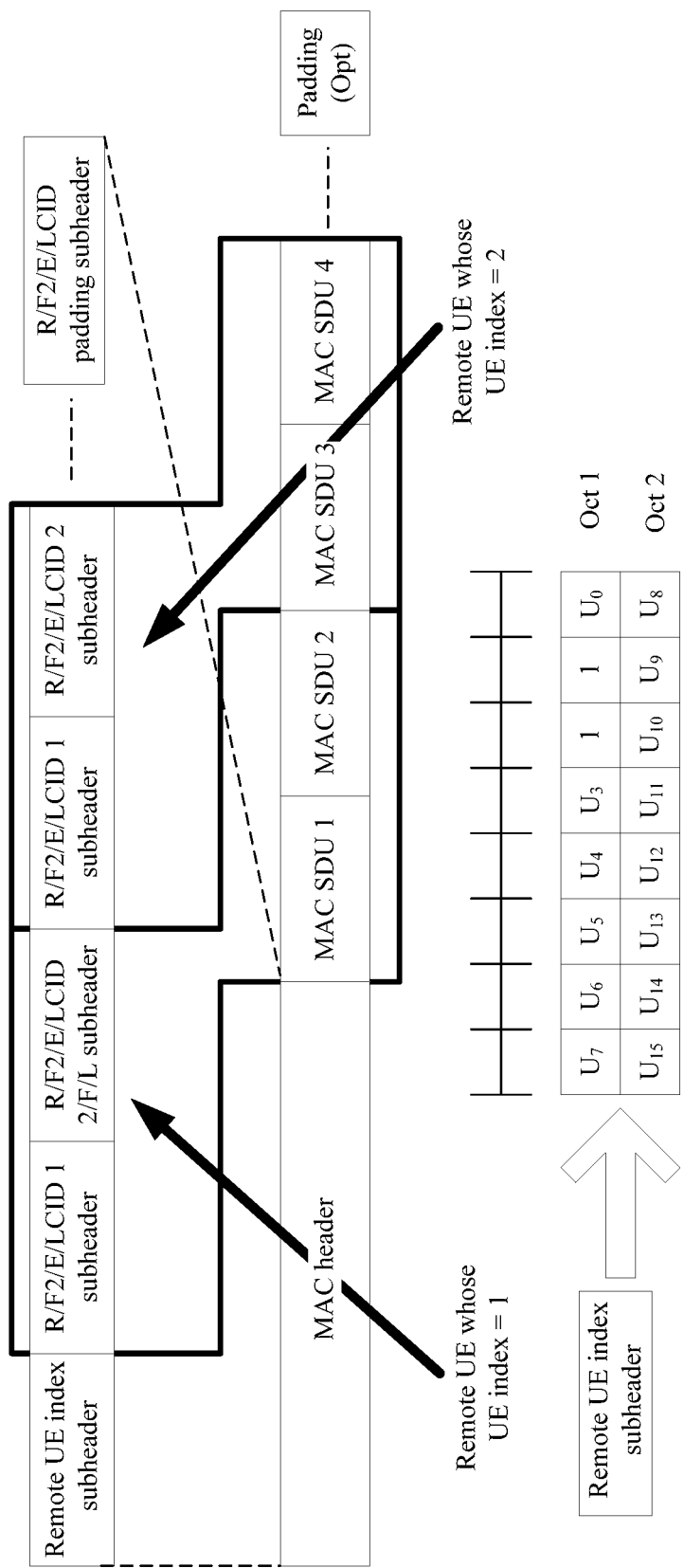
FIG. 4c is a schematic structural diagram of a MAC PDU according to the present invention.

For example, as shown in FIG. 4c, if the relay UE receives, at the same time, data 1 and data 2 that are sent by remote UE 1 and data 1 and data 2 that are sent by remote UE 2, and the relay UE respectively sets up radio bearers for the data 1 and the data 2 that are sent by the remote UE 1: a radio bearer whose logical channel identifier LCID is configured as an LCID 1, and a radio bearer whose logical channel identifier LCID is configured as an LCID 2, and respectively sets up radio bearers for the data 1 and the data 2 that are sent by the remote UE 2: a radio bearer whose logical channel identifier LCID is configured as the LCID 1, and a radio bearer whose logical channel identifier LCID is configured as the LCID 2, the relay UE respectively fills, into a MAC SDU 1 and a MAC SDU 2, the received data 1 and the received data 2 that are sent by the remote UE 1; respectively fills, into a MAC SDU 3 and a MAC SDU 4, the received data 1 and the received data 2 that are sent by the remote UE 2; respectively fills 1 into locations in a bitmap of a MAC subheader 1 that correspond to the remote UE 1 and the remote UE 2; fills 0 into other locations; fills the LCID 1 into a MAC subheader 2; fills the LCID 2 into a MAC subheader 3; fills the LCID 1 into a MAC subheader 4; and fills the LCID 2 into a MAC subheader 5.

It should be noted that in the solution (1.4), as shown in FIG. 4c, the MAC subheader into which the LCID is added may further include other bits in addition to the LCID, such as R, E, F, and F2 bits, and a value of the R bit may be used to indicate whether a MAC SDU indicated by the LCID in the MAC subheader and a MAC SDU indicated by an LCID in a next MAC subheader adjacent to the MAC subheader include data of same remote UE. In addition, the MAC PDU may further include a MAC CE and padding (Padding), and the MAC header may further include a MAC subheader corresponding to the MAC CE and a padding subheader corresponding to the padding. This is not limited in this embodiment of the present invention.

Solution (1.5): The data of the remote UE, the LCID of each radio bearer that carries the data of the remote UE, and the remote UE index are added into a MAC PDU and sent to the base station.

The MAC PDU may include a MAC header, a MAC CE, and at least one MAC SDU.

The MAC CE may include a bitmap (bitmap), the at least one MAC SDU may include N MAC SDUs that are in a one-to-one correspondence with the N radio bearers, and each MAC SDU is configured to carry data on a radio bearer corresponding to the MAC SDU.

The bitmap in the MAC CE includes at least one bit that is in a one-to-one correspondence with at least one remote UE, a bit n in the at least one bit is used to indicate whether the MAC PDU includes data of remote UE whose second identifier is n and that is connected to the relay UE, n is 0 or an integer greater than or equal to 1. A quantity of bits in the bitmap depends on a maximum quantity of remote UEs that can be connected to the relay UE. In the solution (1.5), for example, the bitmap may include 16 bits, an $n^{th}$ bit corresponds to remote UE whose index is n, a number "1" is used to indicate that the MAC PDU includes data of the remote UE corresponding to the bit, and a number "0" is used to indicate that the MAC PDU does not include the data of the remote UE corresponding to the bit. In addition, another value may be used for the bit to indicate whether the MAC PDU includes the data of the remote UE corresponding to the bit. This is not limited in the present invention.

To indicate the MAC CE that carries the bitmap and a MAC SDU that includes data on a radio bearer, in the solution (1.5), the MAC header may include: a fourth MAC subheader that includes an LCID, where the LCID included in the fourth MAC subheader is used to indicate the MAC CE that includes the bitmap; and N MAC subheaders that are in a one-to-one correspondence with the N MAC SDUs, where each of the N MAC subheaders includes an LCID used to identify a radio bearer corresponding to the MAC subheader and to indicate a MAC SDU that includes data on the radio bearer corresponding to the MAC subheader.

It can be learned from the foregoing description that, in the solution (1.5), the MAC CE including the bitmap is used to indicate specific remote UE whose data is carried in the MAC PDU, and data on a plurality of radio bearers of the remote UE is correspondingly added into a plurality of MAC SDUs and sent to the base station. In addition, the MAC subheader including the LCID is used to indicate a MAC SDU that carries the bitmap and the data.

Figure 4D:
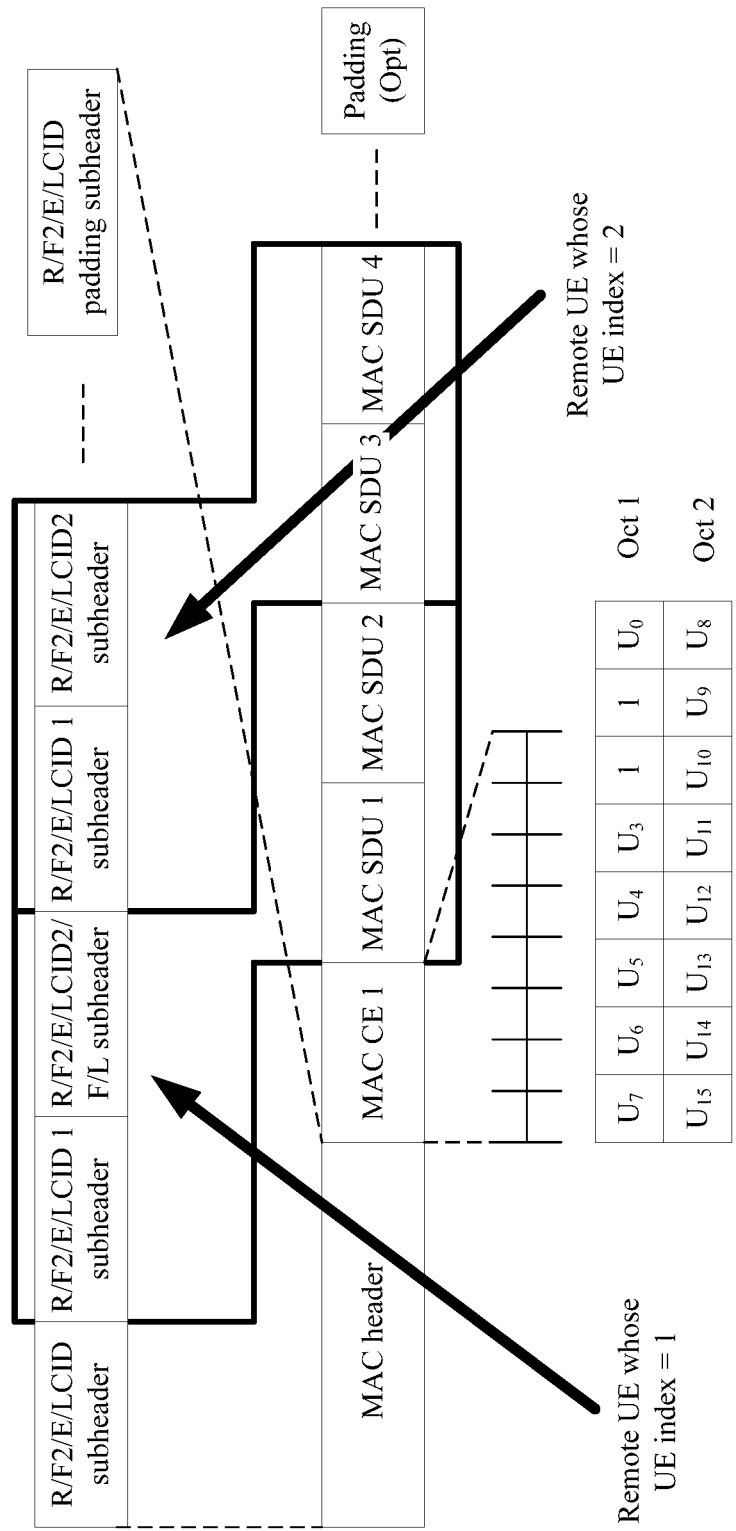
FIG. 4d is a schematic structural diagram of a MAC PDU according to the present invention.

For example, as shown in FIG. 4d, if the relay UE receives, at the same time, data 1 and data 2 that are sent by remote UE 1 and data 1 and data 2 that are sent by remote UE 2, and the relay UE respectively sets up radio bearers for the data 1 and the data 2 that are sent by the remote UE 1: a radio bearer whose logical channel identifier LCID is configured as an LCID 1, and a radio bearer whose logical channel identifier LCID is configured as an LCID 2, and respectively sets up radio bearers for the data 1 and the data 2 that are sent by the remote UE 2: a radio bearer whose logical channel identifier LCID is configured as the LCID 1, and a radio bearer whose logical channel identifier LCID is configured as the LCID 2, the relay UE respectively fills 1 into locations in a bitmap of a MAC CE 1 that correspond to the remote UE 1 and the remote UE 2; fills 0 into other locations; respectively fills, into a MAC SDU 1 and a MAC SDU 2, the received data 1 and the received data 2 that are sent by the remote UE 1; respectively fills, into a MAC SDU 3 and a MAC SDU 4, the received data 1 and the received data 2 that are sent by the remote UE 2; fills, into a MAC subheader 1, an LCID used to identify the MAC CE including the bitmap; fills the LCID 1 into a MAC subheader 2; fills the LCID 2 into a MAC subheader 3; fills the LCID 1 into a MAC subheader 4; and fills the LCID 2 into a MAC subheader 5.

It should be noted that, in the solution (1.5), as shown in FIG. 4d, the MAC PDU may further include padding (Padding), and the MAC header may further include a MAC subheader corresponding to the MAC CE and a padding subheader corresponding to the padding. This is not limited in this embodiment of the present invention.

In addition, same as the solution (1.3), a new LCID value is defined on each of an uplink transmission channel and a downlink transmission channel in the solution (1.5), to indicate the MAC CE that includes the remote UE index.

In this way, the relay UE may send the data of the remote UE to the base station by using the foregoing solutions (1.1) to (1.5).

Correspondingly, as an inverse process of a process in which the relay UE sends the data to the base station, when sending data of a plurality of UEs (remote UE or relay UE) to the relay UE, the base station may also send the data of the UE, an identifier of a radio bearer of the UE, and a UE index together to the relay UE by using the foregoing method, so that the relay UE determines, based on the received data of the UE, the received identifier of the radio bearer of the UE, and the received UE index, specific UE (the relay UE or remote UE connected to the relay UE) to which the data is transmitted.

Figure 5:
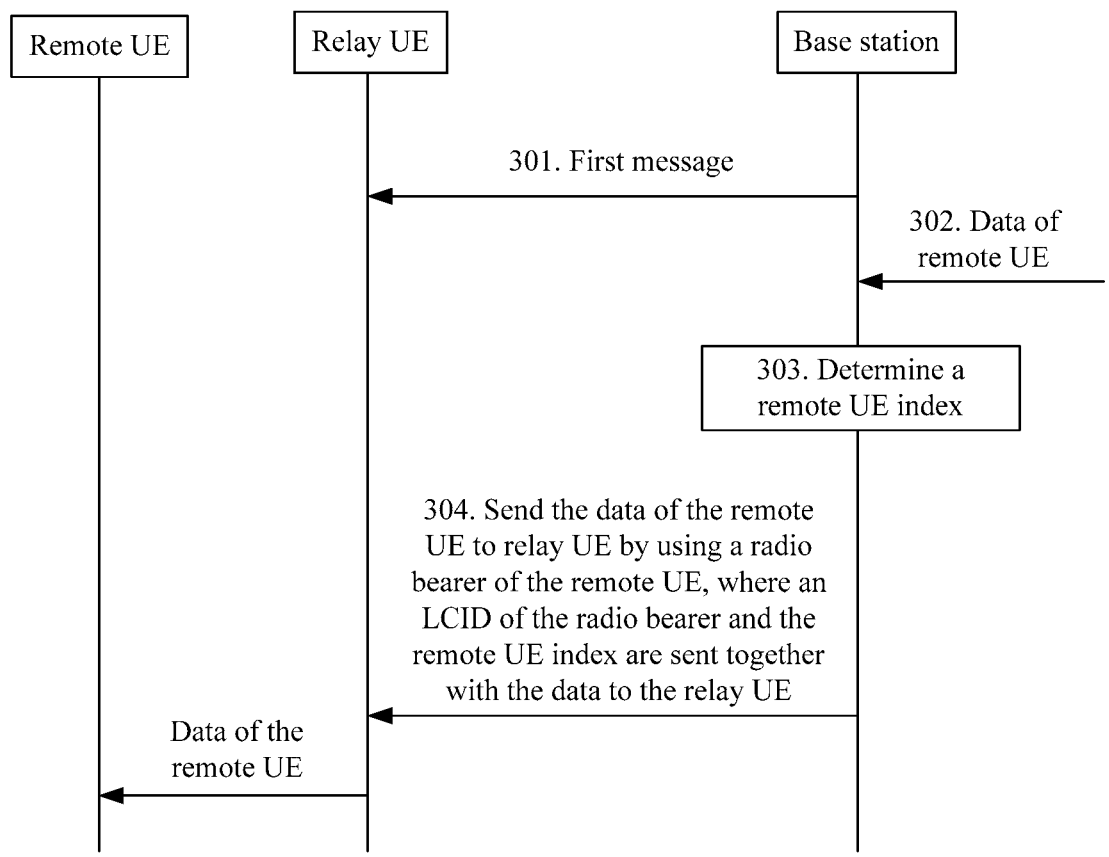
FIG. 5 is a flowchart of a data transmission method according to an embodiment of the present invention.

With reference to FIG. 5, a solution in which a base station sends data to relay UE is described below by using an example in which the base station sends data of at least one remote UE to the relay UE and correspondingly, the relay UE separately sends the received data to the at least one remote UE. As shown in FIG. 5, the solution may include the following steps.

301. A base station sends a first message to relay UE, where the first message is used to set up at least one first radio bearer that is used to transmit, between the base station and the relay UE, data of remote UE connected to the relay UE, and the first message includes a configuration parameter of the at least one first radio bearer.

A configuration parameter of each of the at least one first radio bearer includes an identifier of the first radio bearer and/or a logical channel identifier LCID corresponding to the first radio bearer.

302. The base station obtains the data of the remote UE.

Optionally, the base station may obtain the data of the remote UE from a core network.

303. The base station determines a remote UE index.

The remote UE may be any remote UE connected to the relay UE, and the base station knows an index of each of at least one remote UE.

Optionally, after receiving the data of the remote UE that is sent by the core network, the base station may determine the remote UE index based on a C-RNTI of the remote UE and a mapping relationship between the remote UE index and the C-RNTI of the remote UE. For a manner in which the base station determines the remote UE index, refer to a subsequently described solution shown in FIG. 6 or FIG. 7.

For a manner in which the base station sets up a radio bearer for the data of the remote UE, refer to the prior art. Details are not described herein.

304. The base station sends the data of the remote UE to the relay UE by using a radio bearer of the remote UE, where an LCID of the radio bearer and the remote UE index are sent to the relay UE together with the data.

The radio bearer of the remote UE may be the first radio bearer, in the solution shown in FIG. 3a, that is determined by the relay UE and that is used to send the data of the remote UE.

It should be noted that, when sending the data of the remote UE to the relay UE, the base station may further send data of the relay UE, and this is not limited in this embodiment of the present invention. To be specific, in the present invention, the solution shown in FIG. 5 may be used to send data of a plurality of remote UEs or relay UEs to the base station. However, when the data of the relay UE is sent, a relay UE index may not be carried.

Optionally, in step 204, the base station may send the data of the remote UE, an LCID of each radio bearer of the remote UE, and the remote UE index to the relay UE by using the following solutions (2.1) to (2.5).

Solution (2.1): When scheduling downlink data to the remote UE/the relay UE, the base station adds an index of the remote UE or the relay UE that scheduling information is for in to DCI (for example, a DCI format 1A) used for scheduling the downlink data, so that the relay UE can determine, based on the index, whether the received downlink data is data sent to the relay UE or data sent to specific remote UE.

It should be noted that, only after the base station configures specific relay UE to start providing a data forwarding service for remote UE, downlink control information sent to the relay UE includes the index. To be specific, when decoding the DCI, the relay UE decodes the DCI based on a quantity of bits in the DCI that includes the index and a format of the DCI. Otherwise, the relay UE decodes the DCI based on a quantity of bits included in the current DCI and a format of the current DCI. When DCI sent by the base station is used to schedule downlink data transmission of the relay UE, the DCI includes the index, for example, the index may be set to 0000 (it is assumed that the index is represented by 4 bits).

Solutions (2.2) to (2.5) are the same as the solutions (1.2) to (1.5), and details are not described herein again.

In this way, when sending data of a plurality of remote UEs to the relay UE, the relay UE may add, into the data, remote UE indexes and LCIDs of radio bearers on which the data of the remote UE is sent, to avoid, through repeated use of the LCID, a prior-art problem that an LCID has limited values. In addition, the remote UE index is sent to identify specific remote UE that sends data on radio bearers with a same LCID.

Figure 6:
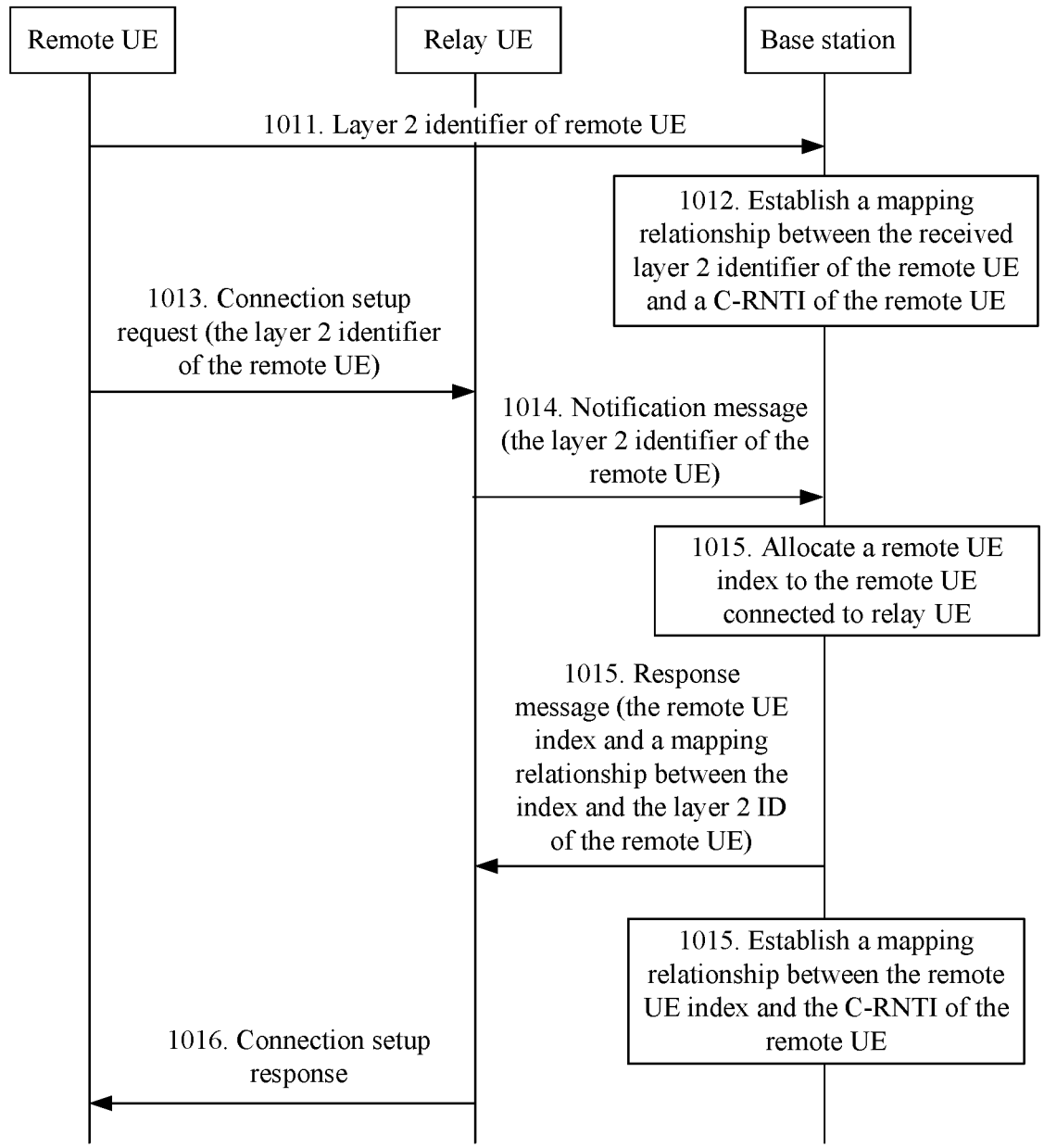
FIG. 6 is a flowchart of a method for determining a remote UE index according to an embodiment of the present invention.
Figure 7:
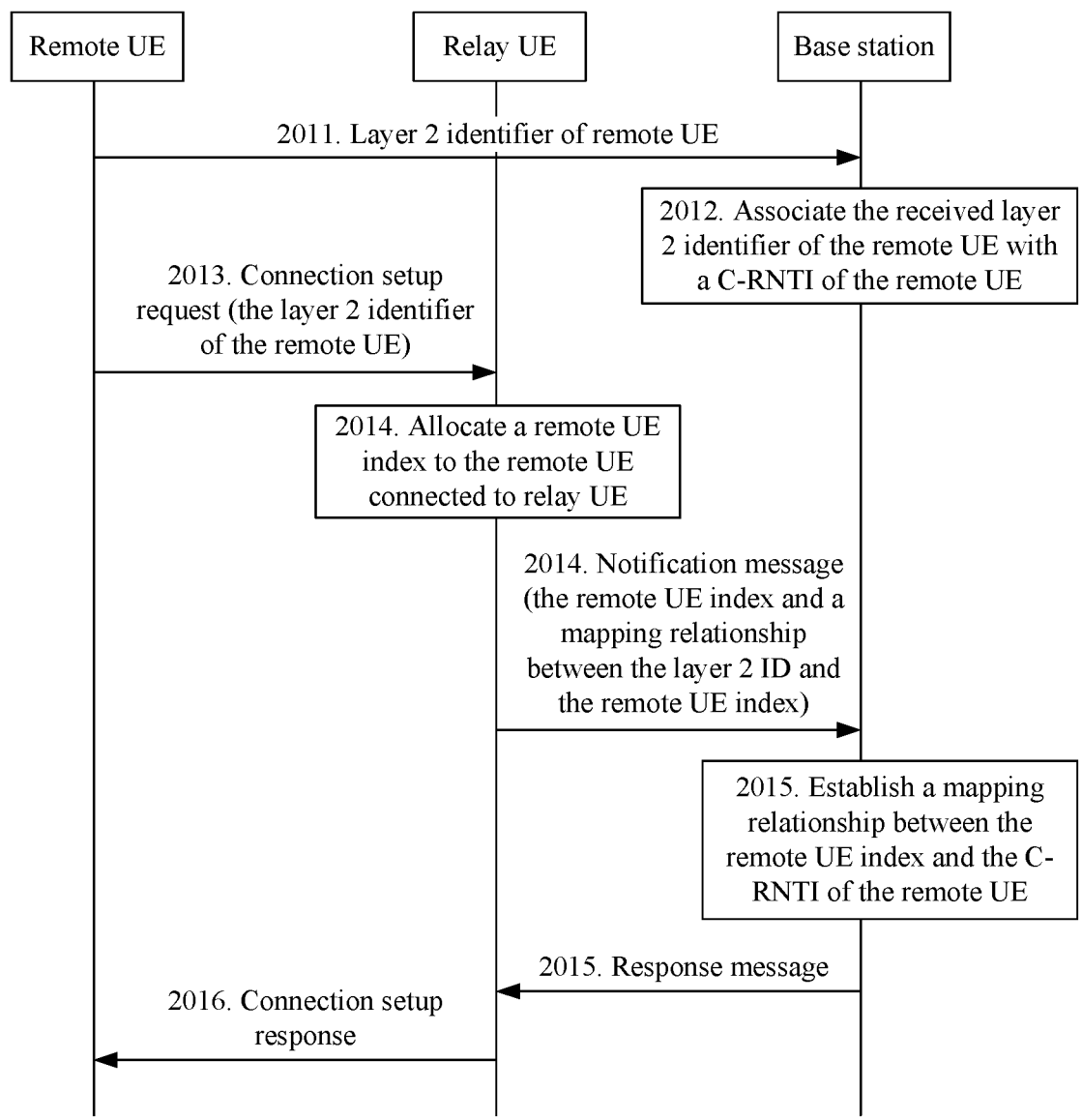
FIG. 7 is a flowchart of a method for determining a remote UE index according to an embodiment of the present invention.
Figure 8:
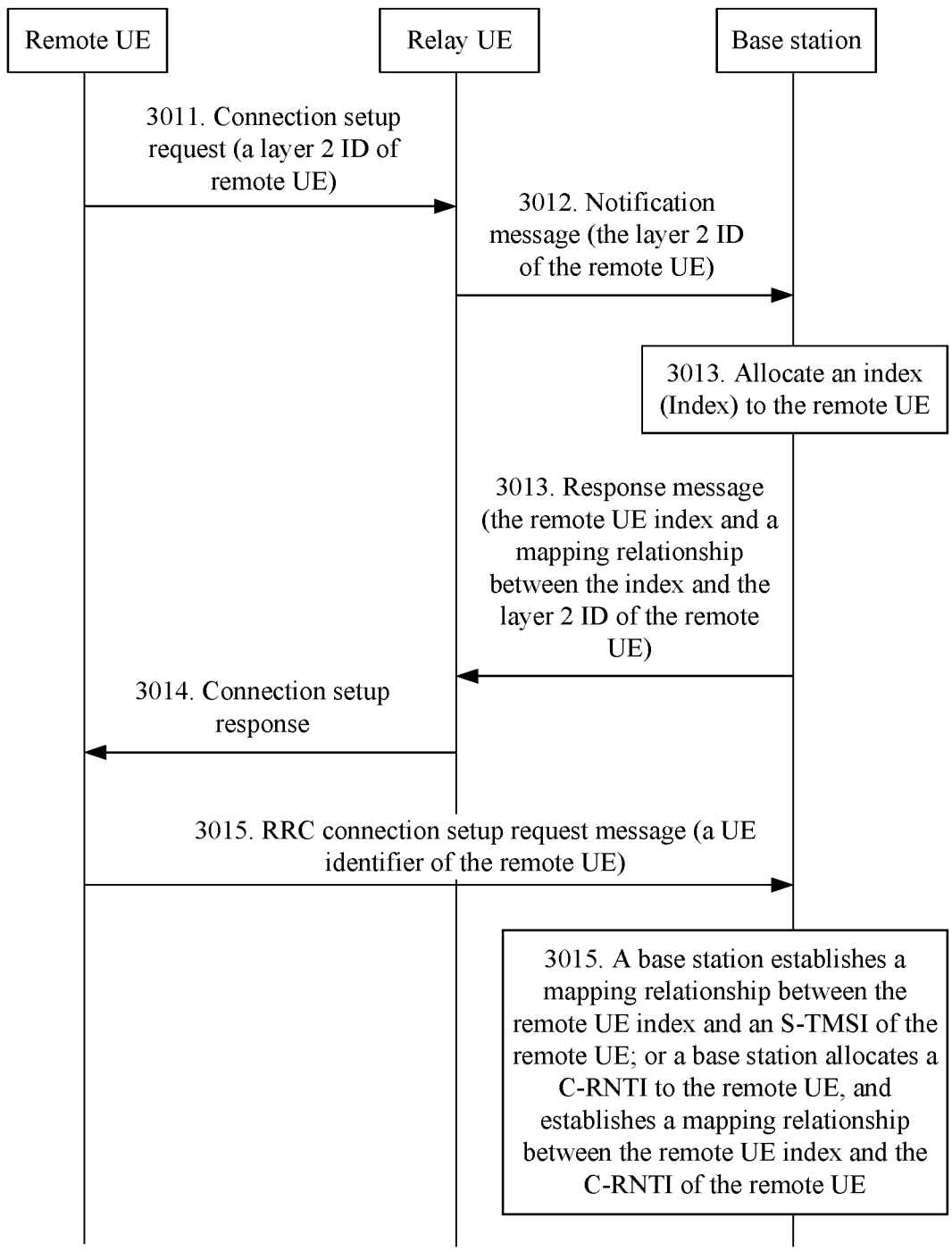
FIG. 8 is a flowchart of a method for determining a remote UE index according to an embodiment of the present invention.

Optionally, for any remote UE connected to the relay UE, the relay UE and the base station may determine a remote UE index in a manner shown in FIG. 6, FIG. 7, or FIG. 8. As shown in FIG. 6, the manner may include the following steps.

1011. The remote UE reports a layer 2 ID of the remote UE to the base station.

1012. After receiving the layer 2 ID of the remote UE, the base station establishes a mapping relationship between the layer 2 ID of the remote UE and a cell radio network temporary identifier of the remote (C-RNTI) of the remote UE.

The cell radio network temporary identifier (C-RNTI) of the remote UE is a unique identifier of the remote UE in a serving cell of the remote UE.

1013. After the remote UE discovers and finally selects relay UE, the remote UE sends a connection setup request to the relay UE, where the connection setup request is used to request the relay UE to set up a connection to the remote UE, and the connection setup request includes the layer 2 ID of the remote UE.

1014. The relay UE receives the connection setup request sent by the remote UE, and sends a notification message to the base station, where the notification message is used to notify the base station that the remote UE needs to set up a D2D communication connection to the relay UE, and the notification message includes the layer 2 ID of the remote UE.

1015. The base station receives the notification message sent by the relay UE, allocates an index (Index) to the remote UE, and returns, to the relay UE, a response message that includes the index of the remote UE and a mapping relationship between the index and the layer 2 ID of the remote UE, where the response message is used to instruct the relay UE to provide a connection for the remote UE; and meanwhile, the base station establishes the mapping relationship between the index of the remote UE and the C-RNTI of the remote UE.

1016. The relay UE receives the notification message sent by the base station, and returns a connection setup response to the remote UE, where the connection setup response is used to instruct the remote UE to set up a connection to the relay UE.

Optionally, the relay UE may return, before receiving the notification message sent by the base station, the connection setup response to the remote UE.

As shown in FIG. 7, the manner may include the following steps.

Steps 2011 to 2013 are performed. Step 2011 is the same as step 1011 in FIG. 5, step 2012 is the same as step 1012 in FIG. 5, and step 2013 is the same as step 1013 in FIG. 5. Details are not described herein again.

Then, steps 2014 and 2015 are performed.

2014. The relay UE receives the connection setup request sent by the remote UE, allocates an index to the remote UE based on the received layer 2 ID of the remote UE, and sends a notification message to the base station, where the notification message is used to notify the base station that the remote UE needs to set up a D2D communication connection to the relay UE, and the notification message includes the index allocated by the relay UE to the remote UE and a mapping relationship between the layer 2 ID and the index of the remote UE.

2015. The base station receives the notification message sent by the relay UE, and returns, to the relay UE, a response message used to instruct the relay UE to provide a connection for the remote UE; and meanwhile, the base station establishes a mapping relationship between the index of the remote UE and the C-RNTI of the remote UE.

Optionally, the base station may establish the mapping relationship between the index of the remote UE and the C-RNTI of the remote UE based on the mapping relationship established between the layer 2 ID of the remote UE and the C-RNTI of the remote UE in step 2012 and the mapping relationship that is between the layer 2 ID of the remote UE and the index of the remote UE and that is included in the notification message.

2016. The relay UE receives the notification message sent by the base station, and returns a connection setup response to the remote UE, where the connection setup response is used to instruct the remote UE to set up a connection to the relay UE.

As shown in FIG. 8, the manner may include the following steps.

3011. After the remote UE discovers and finally selects relay UE, the remote UE sends a device-to-device communication connection setup request to the relay UE, where the connection setup request is used to request the relay UE to set up a connection to the remote UE, and the connection setup request includes a layer 2 ID of the remote UE.

3012. The relay UE receives the device-to-device communication connection setup request sent by the remote UE, and sends a notification message to the base station, where the notification message is used to notify the base station that the remote UE needs to set up a D2D communication connection to the relay UE, and the notification message includes the layer 2 ID of the remote UE.

3013. The base station receives the notification message sent by the relay UE, allocates an index (Index) to the remote UE, and returns, to the relay UE, a response message that includes the index of the remote UE and a mapping relationship between the index and the layer 2 ID of the remote UE, where the response message is used to instruct the relay UE to provide a connection for the remote UE.

3014. The relay UE receives the notification message sent by the base station, and returns a device-to-device communication connection setup response to the remote UE, where the connection setup response is used to instruct the remote UE to set up a connection to the relay UE.

Optionally, the relay UE may return, before receiving the notification message sent by the base station, the connection setup response to the remote UE.

3015. The base station receives a Radio Resource Control (RRC) connection setup request message of the remote UE. The RRC connection setup request message is forwarded by the relay UE to the base station. Data that is forwarded by the relay UE and that includes the RRC connection setup request message includes the index of the remote UE that is obtained by the relay UE in step 1013. The RRC connection setup request message includes a UE identifier of the remote UE, for example, an S-TMSI (SAE Temporary Mobile Station Identifier). The base station establishes a mapping relationship between the index of the remote UE and the S-TMSI of the remote UE; or the base station allocates a C-RNTI to the remote UE, and establishes a mapping relationship between the index of the remote UE and the C-RNTI of the remote UE.

A resource request method provided in the embodiments of the present invention is mainly described above from a perspective of interaction between the remote UE, the relay UE, and the base station. It may be understood that, to implement the foregoing functions, the remote UE, the relay UE, and the base station each include corresponding hardware structures and/or software modules for executing the functions. Persons of ordinary skill in the art should easily be aware that, in combination with the example units and algorithm steps described in the embodiments disclosed in this specification, the present invention may be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of the present invention.

The remote UE, the relay UE, and the base station each may be divided into function modules based on the method examples in the embodiments of the present invention with reference to the accompanying drawings. For example, function modules corresponding to various functions may be obtained through division, or two or more functions may be integrated into one processing module. The integrated module may be implemented in a form of hardware, or may be implemented in a form of a software function module. It should be noted that the module division in the embodiments of the present invention is an example, and is merely logical function division and may be other division in actual implementation.

Figure 9:
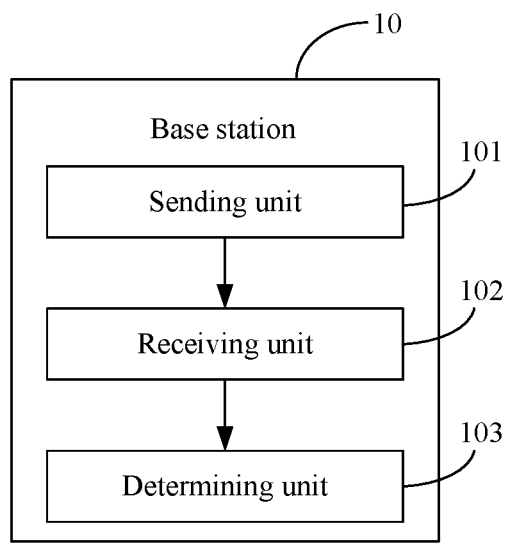
FIG. 9 is a structural diagram of a base station 10 according to an embodiment of the present invention.

When each function module corresponding to each function is obtained through division, FIG. 9 is a possible schematic structural diagram of a base station according to an embodiment of the present invention. As shown in FIG. 9, a base station 10 may be configured to implement the method performed by the base station in the method embodiment shown in FIG. 5, and the base station 20 may include: a sending unit 101, a receiving unit 102, and a determining unit 103. The sending unit 101 is configured to support the base station 10 in performing actions in step 301 and step 304 in FIG. 5. The receiving unit 102 is configured to support the base station 10 in performing actions in step 302 in FIG. 5. The determining unit 103 is configured to support the base station 10 in performing actions in step 303 in FIG. 5.

All related content of the steps in the method embodiments may be cited in function descriptions of corresponding function modules, and details are not described herein again.

When an integrated unit is used, it should be noted that the determining unit 103 shown in FIG. 9 may be integrated into the processor 1012 shown in FIG. 2, so that the processor 1012 performs a specific function of the determining unit 103. The sending unit 101 and the receiving unit 102 may be integrated into the communications interface 1011 shown in FIG. 2, so that the communications interface 1011 performs specific functions of the sending unit 101 and the receiving unit 102.

Figure 10:
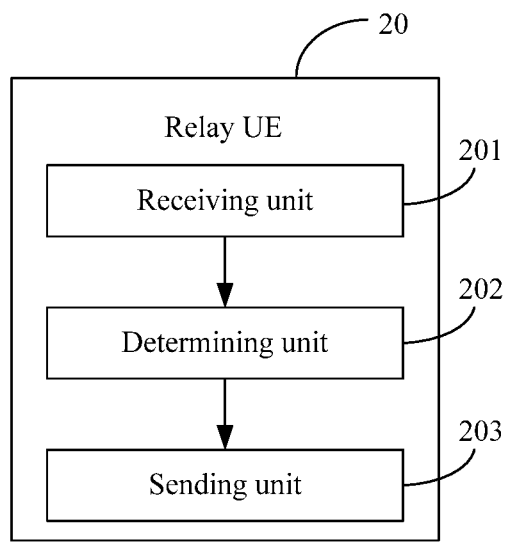
FIG. 10 is a structural diagram of relay UE 20 according to an embodiment of the present invention.
Figure 11:
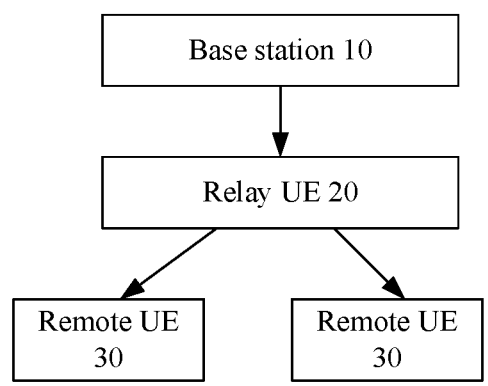
FIG. 11 is a structural diagram of a data transmission system according to an embodiment of the present invention.

When each function module corresponding to each function is obtained through division, FIG. 10 is a possible schematic structural diagram of relay UE according to an embodiment of the present invention. As shown in FIG. 10, relay UE 20 may be configured to implement the method performed by the relay UE in the method embodiment shown in FIG. 3 or FIG. 3a. The relay UE 20 may include: a receiving unit 201, a determining unit 202, and a sending unit 203. The receiving unit 201 is configured to support the relay UE 20 in performing actions in step 201 and step 201. The determining unit 202 is configured to support the relay UE 20 in performing actions in step 202, step 203, and steps 203 to 205 in FIG. 3 and FIG. 3a. The sending unit 203 is configured to support the relay UE 20 in performing actions in step 104 and step 206 in FIG. 3 and FIG. 3a.

All related content of the steps in the method embodiments may be cited in function descriptions of corresponding function modules, and details are not described herein again.

When an integrated unit is used, it should be noted that the determining unit 202 shown in FIG. 10 may be integrated into the processor 2012 shown in FIG. 2, so that the processor 2012 performs a specific function of the determining unit 202. The receiving unit 201 and the sending unit 203 may be integrated into the communications interface 2011 shown in FIG. 2, so that the communications interface 2011 performs specific functions of the receiving unit 201 and the sending unit 203.

According to still another aspect, an embodiment of the present invention further provides a data transmission system, and the data transmission system may include: the remote UE 30, the relay UE 20, and the base station 10 according to any one of the foregoing embodiments.

The data transmission system provided in this embodiment of the present invention implements the foregoing data transmission method shown in FIG. 3, FIG. 3a, or FIG. 5. Therefore, a beneficial effect the same as that of the foregoing data transmission method may be achieved, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network devices. Some or all of the units may be selected based on actual requirements to achieve the objectives of the solutions of the embodiments.

In addition, functional units in the embodiments of the present invention may be integrated into one processing unit, or each of the functional units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes various media that can store program code, such as a universal serial bus (USB) flash drive, a removable hard disk, a read-only memory (ROM), a random access memory (RAM), a magnetic disk, and an optical disc.

It should be finally noted that, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the claims.

What is claimed is:

1. A data transmission method, wherein the method comprises:

receiving, by relay user equipment (UE), data of remote UE by using at least one second radio bearer, wherein the data of the remote UE comprises a first identifier of the remote UE and an identifier of each second radio bearer or a logical channel identifier (LCID) of each second radio bearer, and the first identifier is a layer 2 address of the remote UE;

determining, by the relay UE, a second identifier of the remote UE based on the first identifier of the remote UE, wherein the second identifier is a unique identifier of the remote UE on the relay UE, and the second identifier is allocated by the relay UE or by a base station;

determining, by the relay UE based on the identifier of each second radio bearer or the LCID of each second radio bearer, a first radio bearer corresponding to the data of the remote UE; and sending, by the relay UE, the data of the remote UE, the second identifier of the remote UE, and an LCID of the first radio bearer corresponding to the data of the remote UE to the base station by using the first radio bearer.

2. The method according to claim 1, wherein the method further comprises:

receiving, by the relay UE, a first message sent by the base station, wherein the first message comprises a configuration parameter of at least one first radio bearer that is used to transmit the data of the remote UE connected to the relay UE to the base station, wherein a configuration parameter of each first radio bearer of the at least one first radio bearer comprises an identifier of a particular first radio bearer or an LCID corresponding to the particular first radio bearer; and setting up, by the relay UE, the at least one first radio bearer for the remote UE based on the configuration parameter of the at least one first radio bearer.

3. The method according to claim 1, wherein:

a unique radio bearer identifier or a unique LCID is configured for each first radio bearer of same remote UE, and at least one of a same radio bearer identifier or a same LCID is configured for first radio bearers of different remote UEs.

4. The method according to claim 1, wherein the sending, by the relay UE, the data of the remote UE, the second identifier of the remote UE, and an LCID of the first radio bearer to the base station by using the first radio bearer comprises:

adding the second identifier of the remote UE, the LCID of the first radio bearer, and the data of the remote UE into a Medium Access Control protocol data unit (MAC PDU); and sending the MAC PDU to the base station.

5. The method according to claim 4, wherein:

the second identifier of the remote UE is carried in a first MAC subheader or a MAC control element (CE) in the MAC PDU;

the LCID of the first radio bearer is carried in a second MAC subheader in the MAC PDU; and the data of the remote UE is carried in a MAC service data unit (SDU) in the MAC PDU.

6. The method according to claim 5, wherein that the second identifier of the remote UE is carried in a first MAC subheader in the MAC PDU comprises:

the first MAC subheader comprises the second identifier of the remote UE.

7. The method according to claim 5, wherein that the second identifier of the remote UE is carried in a first MAC subheader in the MAC PDU comprises:

the first MAC subheader comprises a bitmap, wherein the bitmap comprises at least one bit, wherein a bit n in the at least one bit is used to indicate whether the MAC PDU comprises the data of the remote UE whose second identifier is n and that is connected to the relay UE, and wherein n is 0 or an integer greater than or equal to 1.

8. The method according to claim 5, wherein that the second identifier of the remote UE is carried in a MAC CE in the MAC PDU comprises:

the MAC CE comprises the second identifier of the remote UE; and correspondingly, the MAC PDU further comprises a third MAC subheader, wherein the third MAC subheader comprises an LCID used to indicate that the MAC CE comprises the second identifier of the remote UE.

9. The method according to claim 5, wherein that the second identifier of the remote UE is carried in a MAC CE in the MAC PDU comprises:

the MAC CE comprises a bitmap, wherein the bitmap comprises at least one bit, wherein a bit n in the at least one bit is used to indicate whether the MAC PDU comprises the data of the remote UE whose second identifier is n and that is connected to the relay UE, and wherein n is 0 or an integer greater than or equal to 1; and correspondingly, the MAC PDU further comprises a fourth MAC subheader, wherein the fourth MAC subheader comprises a MAC CE used to indicate that the MAC CE comprises the bitmap.

10. The method according to claim 1, wherein the method further comprises:

sending, by the relay UE, a notification message to the base station, wherein the notification message comprises the first identifier of the remote UE; and receiving, by the relay UE, a response message from the base station and the response message comprises a mapping relationship between the second identifier and the first identifier of the remote UE, wherein the second identifier of the remote UE is allocated by the base stations.

11. The method according to claim 1, wherein the determining, by the relay UE, a second identifier of the remote UE based on the first identifier comprises:

receiving, by the relay UE, a connection setup request sent by the remote UE, wherein the connection setup request is used to request the relay UE to set up a connection to the remote UE, and wherein the connection setup request comprises the first identifier of the remote UE; and allocating, by the relay UE, the second identifier of the remote UE, and establishing a mapping relationship between the second identifier of the remote UE and the first identifier of the remote UE; and correspondingly, the method further comprises:

sending, by the relay UE, a notification message to the base station, wherein the notification message comprises at least one of the second identifier of the remote UE or the mapping relationship between the second identifier and the first identifier.

12. The method according to claim 1, wherein:
the first identifier of the remote UE is a source MAC address of the remote UE, or a UE identifier that is of the remote UE and is used for device-to-device communication in a Long Term Evolution (LTE) system.

13. The method according to claim 1, wherein the method further comprises:
receiving, by the relay UE, a RRC connection setup request message from the remote UE; and
sending, by the relay UE, the RRC connection setup request message and the second identifier of the remote UE to the base station.

14. Relay user equipment (UE), wherein the relay UE comprises:
a communications interface, the communications interface configured to receive data of remote UE by using at least one second radio bearer, wherein the data of the remote UE comprises a first identifier of the remote UE and an identifier of each second radio bearer or a logical channel identifier (LCID) of each second radio bearer, and the first identifier is a layer 2 address of the remote UE;
at least one processor; and
one or more memories coupled to the at least one processor and storing programming instructions for execution by the at least one processor to:
determine a second identifier of the remote UE based on the first identifier of the remote UE received by the communications interface, wherein the second identifier is a unique identifier of the remote UE on the relay UE, and the second identifier is allocated by the relay UE or by a base station; and
determine, based on the identifier of each second radio bearer or the LCID of each second radio bearer, a first radio bearer corresponding to the data of the remote UE, wherein:
the communications interface is further configured to send, to the base station by using the first radio bearer, the second identifier of the remote UE, the data of the remote UE, and an LCID of the first radio bearer corresponding to the data of the remote UE that is received by the communications interface.

15. The relay UE according to claim 14, wherein:
the communications interface is further configured to receive a first message sent by the base station, wherein the first message comprises a configuration parameter of at least one first radio bearer that is used to transmit the data of the remote UE connected to the relay UE to the base station, wherein:
a configuration parameter of each first radio bearer of the at least one first radio bearer comprises an identifier of a particular first radio bearer or an LCID corresponding to the particular first radio bearer; and
the programming instructions are for execution by the at least one processor to set up the at least one first radio bearer for the remote UE based on the configuration parameter of the at least one first radio bearer.

16. The relay UE according to claim 14, wherein:
a unique radio bearer identifier or a unique LCID is configured for each first radio bearer of same remote UE, and at least one of a same radio bearer identifier or a same LCID is configured for first radio bearers of different remote UEs.

17. The relay UE according to claim 14, wherein the communications interface is further configured to:
send a notification message to the base station, wherein the notification message comprises the first identifier of the remote UE; and
receive a response message from the base station, wherein the response message comprises a mapping relationship between the second identifier and the first identifier of the remote UE, and the second identifier of the remote UE is allocated by the base station.

18. The relay UE according to claim 14, wherein the communications interface is further configured to:
receive a RRC connection setup request message from the remote UE; and
send the RRC connection setup request message and the second identifier of the remote UE to the base station.

19. The relay UE according to claim 14, wherein the communications interface is further configured to:
receive a connection setup request sent by the remote UE, wherein the connection setup request requests the relay UE to set up a connection to the remote UE and comprises the first identifier of the remote UE; and
wherein the programming instructions are for execution by the at least one processor to:
allocate the second identifier of the remote UE;
establish a mapping relationship between the second identifier of the remote UE and the first identifier of the remote UE; and wherein the communications interface is further configured to:
send a notification message to the base station, wherein the notification message comprises at least one of the second identifier of the remote UE or the mapping relationship between the second identifier and the first identifier.

20. The relay UE according to claim 14, wherein the first identifier of the remote UE is a source MAC address of the remote UE or a UE identifier that is of the remote UE, and wherein the first identifier of the remote UE is used for device-to-device communication in a Long Term Evolution (LTE) system.

* * * * *